United States Patent
Kono et al.

(10) Patent No.: US 7,824,786 B2
(45) Date of Patent: Nov. 2, 2010

(54) MEMBRANE ELECTRODE COMPLEX AND SOLID TYPE FUEL CELL USING IT

(75) Inventors: Shunji Kono, Otsu (JP); Masayuki Kidai, Kusatsu (JP); Takao Uete, Otsu (JP)

(73) Assignee: Toray Industries, Inc., Tokyo (JP)

( * ) Notice: Subject to any disclaimer, the term of this patent is extended or adjusted under 35 U.S.C. 154(b) by 159 days.

(21) Appl. No.: 10/556,593

(22) PCT Filed: May 11, 2004

(86) PCT No.: PCT/JP2004/006603

§ 371 (c)(1),
(2), (4) Date: Nov. 14, 2005

(87) PCT Pub. No.: WO2004/102713

PCT Pub. Date: Nov. 25, 2004

(65) Prior Publication Data

US 2007/0009777 A1    Jan. 11, 2007

(30) Foreign Application Priority Data

May 14, 2003    (JP) .............................. 2005-135487

(51) Int. Cl.
H01M 8/10    (2006.01)
(52) U.S. Cl. .......................................... 429/30; 429/40
(58) Field of Classification Search ............... 429/12, 429/27, 30, 40, 33, 46
See application file for complete search history.

(56) References Cited

U.S. PATENT DOCUMENTS 6,011,500 A * 1/2000 Noda et al. ................. 341/144
6,187,467 B1 2/2001 Zhang et al.
7,201,993 B2 * 4/2007 Uchida et al. ................. 429/44
2003/0121603 A1 7/2003 Oh et al.
2003/0141188 A1 7/2003 Imamura et al.

FOREIGN PATENT DOCUMENTS

JP    2001-307751    11/2001
JP    2002-52886 T    9/2002

(Continued)

OTHER PUBLICATIONS

Fukunaga, Hiroshi et al. "Anode Structure and Overpotential of Gas Feed Direct Methanol Fuel Cell," *The Electrochemical Society of Japan, Summaries of the 69th Lectures*: p. 76.

(Continued)

*Primary Examiner*—Jennifer Michener
*Assistant Examiner*—Monique Wills
(74) *Attorney, Agent, or Firm*—Morrison & Foerster LLP

(57) ABSTRACT

A polymer electrolytic material has excellent proton conductivity and excellent fuel shutting property, and accordingly provide a polymer electrolytic fuel cell with a high efficiency. This polymer electrolytic material has an unfreezable water ratio Rw1 defined by the following expression (S1) in a range of 20 to 100% by weight in hydrated state:

$$Rw1 = [Wnf/(Wfc+Wnf)] \times 100 \qquad (S1)$$

in which Wnf represents the unfreezable water content per 1 g of the polymer electrolytic material in dry state and Wfc represents the low freezing point water content per 1 g of the polymer electrolytic material in dry state.

15 Claims, 6 Drawing Sheets

FOREIGN PATENT DOCUMENTS

| | | |
|---|---|---|
| JP | 2002-298870 | 10/2002 |
| JP | 2002-367650 | 12/2002 |
| JP | 2003-036860 | 2/2003 |
| JP | 2003-123786 | 4/2003 |
| JP | 2003-123792 | 4/2003 |
| JP | 2003-203646 | 7/2003 |
| JP | 2003-272672 | 9/2003 |
| JP | 2003-297408 | 10/2003 |

OTHER PUBLICATIONS

Nakagawa, N. et al. "Performance Analysis of a Liquid Feed DMFC," *The Electrochemical Society of Japan, Summaries of the 69$^{th}$ Lectures*: p. 69.

Electrochemical Measurement Manual Basic Version, edited by Electrochemical Society of Japan, pp. 95-101.

* cited by examiner

MEMBRANE ELECTRODE COMPLEX AND SOLID TYPE FUEL CELL USING IT

TECHNICAL FIELD

The present invention relates to a membrane electrode assembly, and a polymer electrolyte membrane fuel cell using the same.

BACKGROUND ART

A fuel cell is usually formed to have, as one unit, a cell wherein: a membrane electrode assembly, which may be abbreviated to an MEA hereinafter, is composed of electrodes of an anode and a cathode, in which reaction for generating electricity is caused, and a polymer electrolyte membrane, which becomes an ion conductor, between the anode and the cathode; and the MEA is sandwiched between separators. The electrodes are composed of: electrode substrates for promoting gas diffusion and performing power collection (feeding), which may be referred to as gas diffusion electrodes or current collectors; and electrocatalyst layers of the anode and the cathode, which are actual electrochemical reaction fields. For example, in the anode of a polymer electrolyte membrane fuel cell, which may be abbreviated to a PEFC hereinafter, a fuel such as hydrogen gas reacts in its anode catalyst layer so as to generate protons and electrons, and the electrons are conducted to its electrode substrate and the protons are conducted to its polymer electrolyte. For this reason, the anode is required to be good in gas diffusivity, electron conductivity and ion conductivity. On the other hand, in the cathode thereof, on its cathode catalyst layer, an oxidizing gas such as oxygen or air reacts with the protons conducted from the polymer electrolyte and the electrons conducted from the electrode substrate so as to generate water. For this reason, the cathode is required to have gas diffusivity, electron conductivity and ion conductivity, and further it becomes necessary to exhaust the generated water therefrom effectively.

Of polymer electrolyte membrane fuel cells, a direct methanol fuel cell, which may be abbreviated to a DMFC hereinafter, wherein an organic solvent such as methanol is used as a fuel, is required to have performances different from those of any conventional. PEFC, wherein hydrogen gas is used as a fuel. In other words, in the DMFC, a fuel such as an aqueous solution of methanol reacts on its anode catalyst layer in the anode, so as to generate protons, electrons and carbon dioxide. The electrons are conducted to its electrode substrate, and the protons are conducted to its polymer electrolyte. The carbon dioxide passes through the electrode substrate to be exhausted to the outside of the system. Therefore, the DMFC is required to have the permeability of a fuel such as an aqueous solution of methanol and the exhaustability of carbon dioxide as well as properties required for the anode electrode of any conventional PEFC.

In conventional MEA's, a product wherein fine metal particles having catalytic power are carried on carbon to make the surface area of the metal catalyst large is used in many cases (see the following Non-patent document 1 and Non-patent document 2). When carbon is used as a catalyst-carrying body as described above, the viscosity of a coating solution of the catalyst is easily adjusted; thus, a layer made of the catalyst is easily formed. As the amount of the fine metal particles carried on carbon is larger, the reaction efficiency per unit area is better. If the amount of the fine metal particles is made too large, the diameter of the fine metal particles becomes large so that the surface area becomes small, thereby lowering the catalyst efficiency. For this reason, there is a limit to the amount of the particles that can be carried. When such a catalyst carried on carbon is used, the catalyst layer becomes thick since the volume of carbon is large. In the DMFC, oxidizing reaction of methanol is not easily caused. Thus, a large amount of a catalyst is required so that a layer made of the catalyst becomes thicker.

(Non-Patent Document 1)
Nakagawa et al., "Production of Liquid Supplying DMFC and Performance Analysis thereof", The Electrochemical Society of Japan, Summaries of the 69th Lectures, p. 69

(Non-Patent Document 2)
Fukunaga et al., "Anode Electrode Structure of Gas Supplying DMFC, and Overvoltage therein", The Electrochemical Society of Japan, Summaries of the 69th Lectures, p. 76

DISCLOSURE OF THE INVENTION

As described above, in conventional MEA's, their catalyst layer becomes thick. Thus, water generated at 20° C. is not easily volatilized, and further the permeability rates of reaction materials, such as fuel and air, or generated carbon dioxide get low. It is therefore difficult that when the reaction resistance at 20° C. is represented by Rr (O·cm$^2$), log Rr is set to a value less than 1. The inventors found out that this reaction resistance Rr correlates with the power. However, according to the conventional art, the Rr was unable to be made low; thus, the power was not easily improved.

Thus, an object of the present invention is to overcome the above-mentioned problems and provide a novel membrane electrode assembly (MEA) capable of improving the permeability rates of fuel and carbon dioxide, thereby making the Rr (O·cm$^2$) low to attain a high power, and a polymer electrolyte membrane fuel cell using the same.

In order to solve the above-mentioned problems, the present invention has the following structures. That is to say, the membrane electrode assembly of the present invention is a membrane electrode assembly comprising electrocatalyst layers, an anode and a cathode each made of an electrode substrate, and a polymer electrolyte membrane sandwiched between the anode and the cathode, and satisfying the following expression:

$$-2 \leq \log Rr < 1$$

wherein the reaction resistance at 20° C. is represented by Rr (O·cm$^2$). In the invention, the membrane electrode assembly can be preferably applied to a polymer electrolyte membrane fuel cell.

The membrane electrode assembly of the invention includes the following preferred embodiments:

(a) The polymer electrolyte membrane is a hydrocarbon-based polymer electrolyte membrane.

(b) A 8-50% by weight solution of methanol in water is used as a fuel supplied to the anode.

(c) The reaction resistance Rr at 20° C. satisfies the following expression:

$$-1.5 \leq \log Rr \leq 0.5$$

(d) The reaction resistance Rr at 20° C. satisfies the following expression:

$$-1 \leq \log Rr \leq 0.3$$

(e) The thickness of the anode catalyst layer is 1 μm or more and 150 μm or less.

(f) The amount of platinum in the anode catalyst layer is 0.1 mg/cm$^2$ or more and 25 mg/cm$^2$ or less.

(g) The amount of a carbonaceous material in the anode catalyst layer is 0.1 mg/cm$^2$ or more and 5 mg/cm$^2$ or less.

(h) The amount of a carbonaceous material in the anode catalyst layer is 0.1 mg/cm$^2$ or more and 1 mg/cm$^2$ or less.

(i) The amount of an ion conductor in the anode catalyst layer is 0.1 mg/cm$^2$ or more and 15 mg/cm$^2$ or less.

(j) The amount of platinum in the anode catalyst layer is 0.5 mg/cm$^2$ or more and 5 mg/cm$^2$ or less and the thickness of the anode catalyst layer is 1 μm or more and 30 μm or less.

(k) The amount of platinum in the anode catalyst layer is 1.5 mg/cm$^2$ or more and 4 mg/cm$^2$ or less and the thickness of the anode catalyst layer is 5 μm or more and 30 μm or less.

(l) The thickness of the cathode catalyst layer is 1 μm or more and 500 μm or less.

(m) The amount of platinum in the cathode catalyst layer is 0.1 mg/cm$^2$ or more and 25 mg/cm$^2$ or less.

(n) The amount of a carbonaceous material in the cathode catalyst layer is 0.1 mg/cm$^2$ or more and 5 mg/cm$^2$ or less.

(o) The amount of an ion conductor in the cathode catalyst layer is 0.1 mg/cm$^2$ or more and 15 mg/cm$^2$ or less.

(p) The amount of platinum in the cathode catalyst layer is 1 mg/cm$^2$ or more and 8 mg/cm$^2$ or less and the thickness of the cathode catalyst layer is 1 μm or more and 40 μm or less.

(q) The amount of platinum in the cathode catalyst layer is 3 mg/cm$^2$ or more and 8 mg/cm$^2$ or less and the thickness of the cathode catalyst layer is 5 μm or more and 30 μm or less.

(r) The electrocatalyst layers comprise a metal made of at least one element selected from the group consisting of Pt, Ru, Au, Pd, Ir and Fe.

In the present invention, the above-mentioned membrane electrode assembly is preferably used for a polymer electrolyte membrane fuel cell. According to a preferred embodiment of the invention, the resultant polymer electrolyte membrane fuel cell can be driven with a solution of methanol in water. The reaction resistance Rr thereof at 20° C. satisfies the following expression:

$$-2 \leq \log Rr < 1,$$

or the following expression:

$$-1.5 \leq \log Rr < 0.5$$

In the invention, the polymer electrolyte membrane fuel cell can be preferably used as a power source for a portable instrument, and is preferably mounted and used in a portable instrument or a mobile device.

According to the present invention, provided are a novel membrane electrode assembly which can attain a high power, and a polymer electrolyte membrane fuel cell using the same. This makes it possible to make a polymer electrolyte membrane fuel cell small-sized, and can be used as a power source for various electric appliances, typical examples of which include mobile electric appliances such as a cellular phone and a note-sized personal computer. Thus, the practicability thereof is high.

BEST MODES FOR CARRYING OUT THE INVENTION

Figure 1:
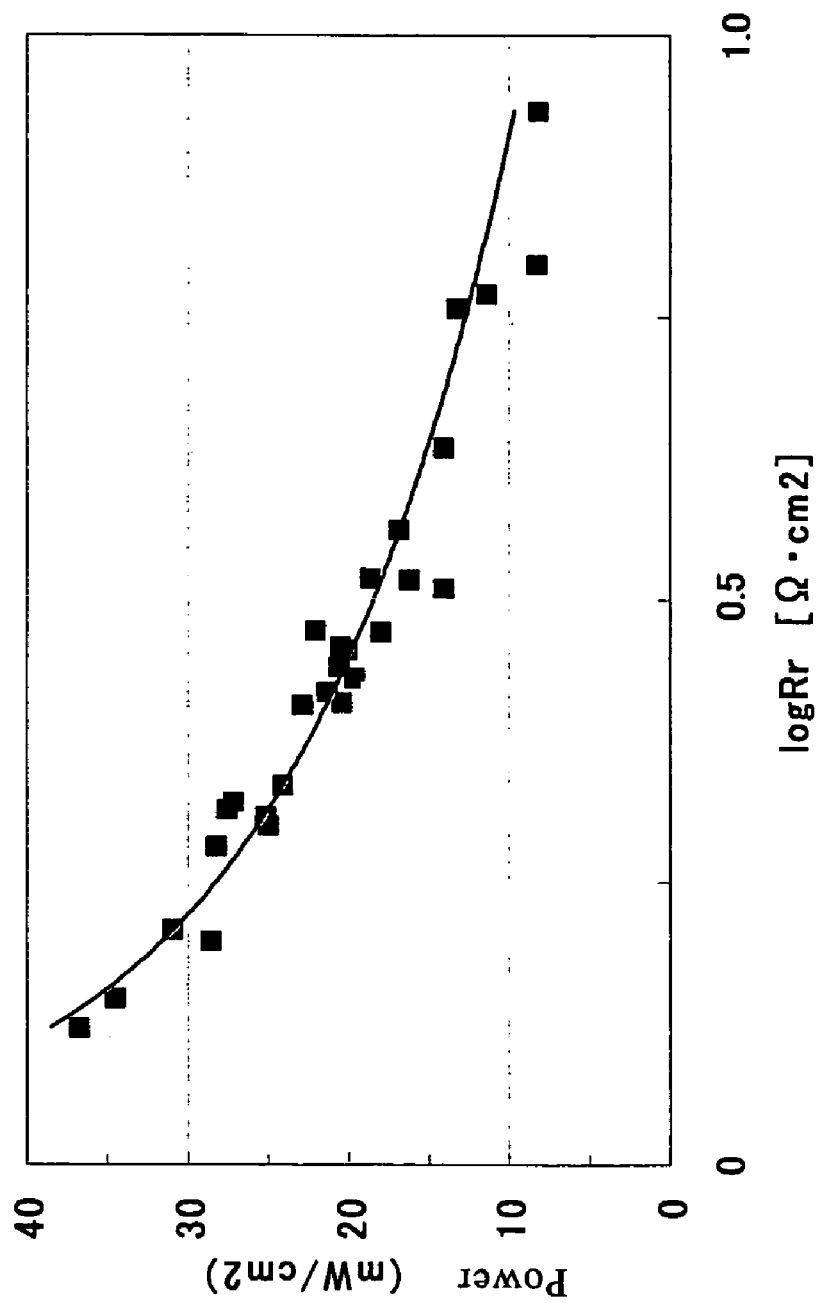
FIG. 1 is a graph showing an example of the relationship between the power of the MEA of the present invention and the log Rr thereof.

The following will describe best modes of the membrane electrode assembly and the polymer electrolyte membrane fuel cell of the present invention.

The membrane electrode assembly (MEA) of the present invention is an assembly comprising: electrocatalyst layers, electrodes called an anode and a cathode, each made of an electrode substrate; and a polymer electrolyte membrane sandwiched between the anode and the cathode.

This MEA is sandwiched between separators or the like, so as to constitute a cell. A fuel cell wherein hydrogen or a solution of methanol in water, which becomes a fuel, and oxygen, air or the like that reacts with generated protons are supplied into the above-mentioned constituted cell so as to generate electricity is called a polymer electrolyte membrane fuel cell. The electrodes are composed of the electrode substrates, which may be referred to as the gas diffusion electrodes or current collectors, for attaining the promotion of gas diffusion and power collection (feeding), and the electrocatalyst layers of the anode and the cathode, which are actual electrochemical reaction fields.

For example, in the anode, a fuel such as hydrogen gas reacts on the anode catalyst layer, so as to generate protons and electrons. The electrons are conducted to the electrode substrate, and the protons are conducted to the polymer electrolyte membrane. For this reason, the anode is required to have good gas diffusivity, electron conductivity and ion conductivity.

On the other hand, in the cathode, an oxidizing gas such as oxygen or air reacts with the protons conducted from the polymer electrolyte membrane and the electrons conducted from the electrode substrate on the cathode catalyst layer, so as to generate water. For this reason, the cathode is required to have gas diffusivity, electron conductivity and ion conductivity, and further it becomes necessary to exhaust the generated water therefrom effectively.

In a DMFC wherein an organic solvent such as methanol is used as a fuel, a solution of methanol in water or some other fuel reacts in its anode, so as to generate protons, electrons and carbon dioxide. The electrons are conducted to the electrode substrate, and the protons are conducted to the polymer electrolyte membrane. The carbon dioxide passes through the electrode substrate to be exhausted to the outside of the system. Therefore, the DMFC is required to have the permeability of the fuel, such as the aqueous solution of methanol, and the exhaustability of carbon dioxide as well as properties required for the anode electrode of polymer electrolyte membrane fuel cells (PEFC's), wherein hydrogen is used as a fuel.

The MEA of the invention satisfies the following expression:

$$-2 \leq \log Rr < 1$$

wherein the reaction resistance at 20° C. is represented by Rr ($\Omega \cdot cm^2$). The reaction resistance Rr at 20° C. preferably satisfies the following expression:

$$-1.5 \leq \log Rr \leq 0.5$$

and more preferably satisfies the following expression:

$$-1.5 \leq \log Rr \leq 0.3$$

Hitherto, in order to analyze MEA's, the reaction resistance thereof has been analyzed. However, no correlative relationship between the reaction resistance and the power thereof has been found out. However, the inventors have found out a large correlation between the reaction resistance and the power, as shown in FIG. 1. In other words, when log Rr is larger than 1 in FIG. 1, a sufficient power is not obtained. Thus, it is understood that it is important to set log Rr to a value less than 1. When log Rr is 0.5 or less, the power is more improved. When it is 0.3 or less, the power is even more improved.

Meanwhile, it is important to set the lower limit of log Rr to −2 or more. If log Rr is lower than −2, a short-circuiting may be generated inside the MEA. Thus, a high power is not obtained and further heat or fire resulting from abnormal reaction may be generated. If log Rr is −1.5 or more, the possibility of the short-circuiting becomes smaller. If log Rr is −1 or more, the possibility of the short-circuiting becomes even smaller.

In the invention, the reaction resistance Rr can be measured by the alternating current impedance method. The alternating current impedance method is a method of deciding the transfer function of an electrode reaction by comparing a since wave input with the response thereto. Specifically, the reaction resistance Rr can be measured by a method described in a publication ("Electrochemical Measurement Manual Basic Version, edited by The Electrochemical Society of Japan, Maruzen").

Figure 2:
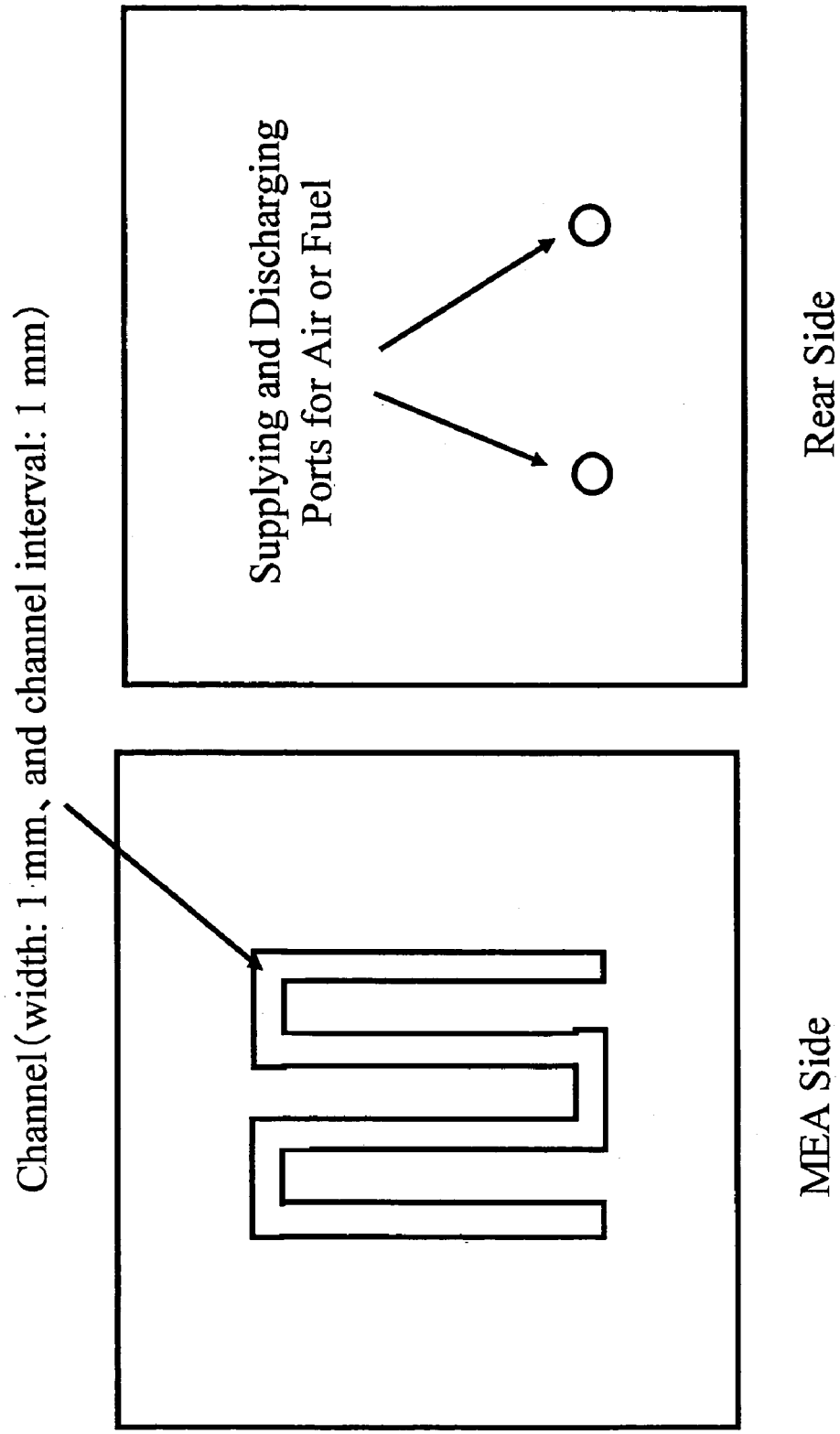
FIG. 2 are schematic views illustrating an example of the shape of a channel in the separator of the present invention.
Figure 3:
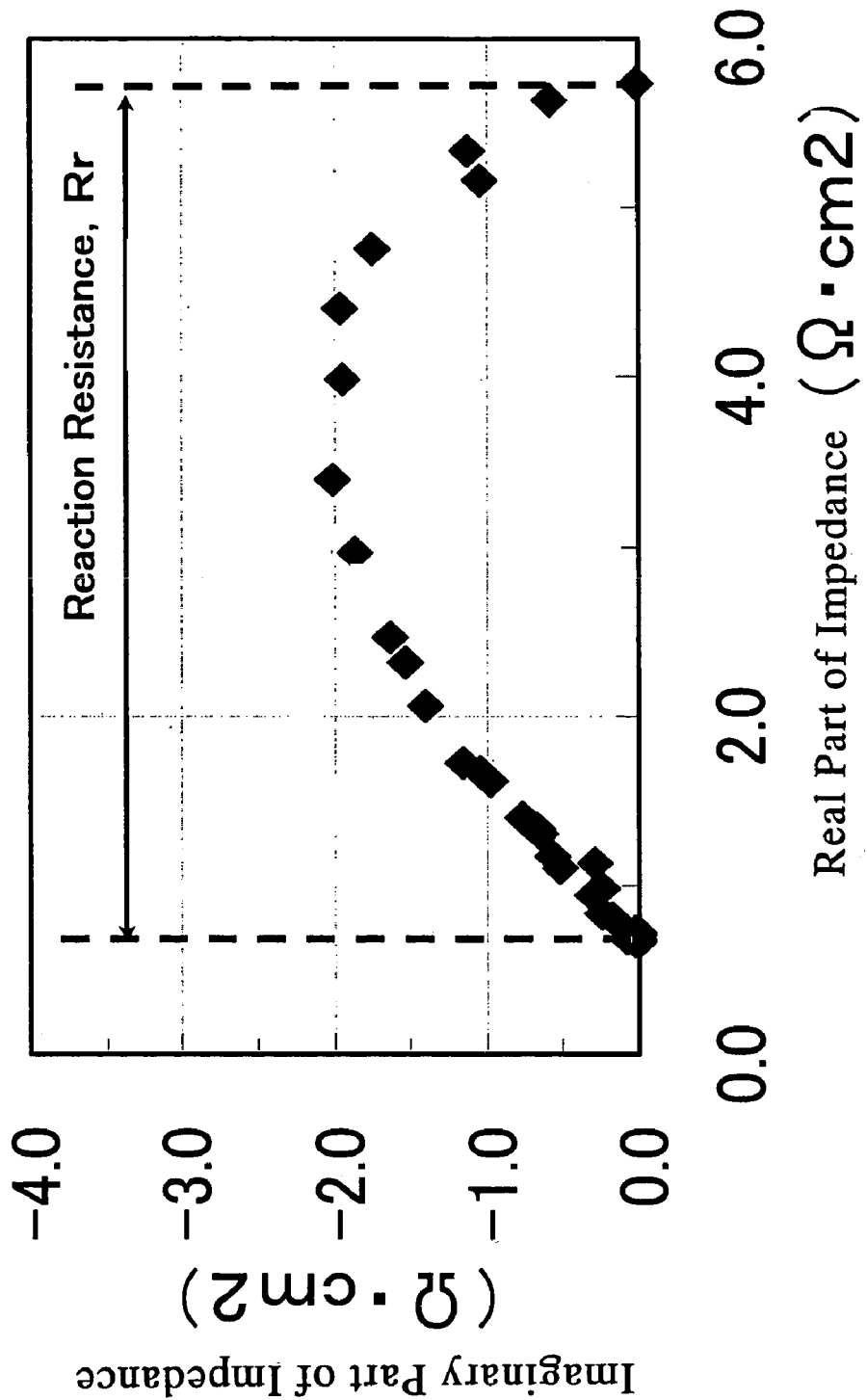
FIG. 3 is a graph showing an example of the Nyquist plot of the MEA of the present invention.

The reaction resistance Rr of the MEA of the invention can be measured by, for example, a method described in the following. An MEA having an electrode area of 5 cm$^2$ is sandwiched between carbon separators having a channel shape illustrated in FIG. 2, the channel being a channel 1 mm square, and 1 mm wide in its current collecting portion. The temperature thereof is controlled to a temperature of 20° C. with temperature-controlling water. A 1 mol/L (=3.2% by weight) solution of methanol in water is caused to flow into its anode. As the solution of methanol in water, a 8 to 50% (inclusive) by weight solution of methanol in water is preferably used. The solution is caused to flow at a flow rate of 0.2 mL/min. Synthesized air mixes with O2 and N2 is caused to flow in its cathode at a flow rate of 50 mL/min. About the MEA prepared in this way, a potentiostat SI1287 and a frequency response analyzer 1225B manufactured by Solartron Co. are used to measure the reaction resistance Rr as follows. For example, an electric current of 40 mA/cm$^2$ and an amplitude of 4 mA/cm$^2$ are applied to the MEA to make a measurement within the frequency range of 50 kHz to 10 mHz. The impedance is measured. The measured impedance values are indicated on a complex plane, which is referred to as a Nyquist plot. The size (the distance of the X-axis intercept) of the resultant arc or deformed arc is defined as the reaction resistance Rr. At this time, the right end of the resultant X-axis intercept is the right end of a semicircle obtained from the Nyquist plot. When no semicircle is obtained, a semicircle is estimated from the Nyquist plot. The right end of the X-axis intercept thereof is used. An example of measured results of the impedance of an MEA is shown in FIG. 3, and further the reaction resistance Rr at this time is shown. Since the reaction resistance Rr depends largely onto the applied electric current value and amplitude, the electric current value at the time of the largest power is applied and the amplitude is set to ¹⁄₁₀ thereof in the invention.

The measured value of the reaction resistance Rr in the present invention may be varied in accordance with measuring conditions. Examples of the factor which produces an effect on the measured value include reactants caused to flow in the anode and the cathode, the flow quantity and flow rate thereof, the channel shape of the separator, and the pattern of the channel. For example, when a solution of methanol in water is caused to flow into the anode, the power may lower if the concentration thereof is too low. It appears that this is based on short supply of the fuel. Conversely, if the concentration of the solution of methanol in water is too high, the power may lower as well. It appears that this is based on the matter that the permeation amount of methanol into the cathode increases so that the potential of the cathode falls. About the flow quantity of the solution of methanol in water also, an optimal point may be given in the same manner. In the cathode also, an optimal point may be given in accordance with the supply amount or the flow rate of the reactant. For example, when air is caused to flow into the cathode, optimal conditions for the power may be found out about the flow quantity of the air or the flow rate thereof. When the flow quantity or the flow rate of the air is increased, the supply amount of the reactant or the exhaust amount of a generated material may increase or the polymer electrolyte membrane may be dried. It is therefore assumed that an optimal point for the power may be found out.

The shape of the channel in the separator may produce a large effect on the flow quantity or the flow rate of the above-mentioned solution of methanol in water or air. Accordingly, the shape may produce an effect on the power. Therefore, the optimization of the above-mentioned factors is also one preferred method for making the reaction resistance Rr low.

As described above, according to the MEA of the invention, a high power can be attained by setting the reaction resistance Rr to satisfy: $-2 \leq \log Rr < 1$. This would be based on the following reason. In conventional MEA's, log Rr is not easily set to a value less than 1 since water generated at 20° C. does not evaporate and the permeation rates of the fuel, air and generated carbon dioxide are small. As descried above, it has been found out that in the present invention the reaction resistance Rr produces an effect on the power and they have a correlative relationship; in the conventional art, the power is not easily improved since the reaction resistance Rr can not be made low. However, in the MEA of the invention, log Rr at 20° C. can be made to satisfy $-2 \leq \log Rr < 1$ by improving the permeation rate of the fuel or carbon dioxide. As a result, a high power would be obtained. An example of the relationship between the power and log Rr that the inventors have found out is as shown in FIG. 1.

In the MEA of the invention, the catalyst amount in its catalyst layer and the thickness thereof are important. When ranges thereof are specified, the reaction resistance Rr can be decreased so as to generate a high power. In order to yield the MEA of the invention, it is effective to combine metal catalyst particles with a product wherein metal catalyst particles are carried on an electron conductor such as carbon. It is generally known that in order to improve the power of an MEA, the amount of a catalyst therein is increased. However, if the amount of a generally-used product wherein metal catalyst particles are carried on an electron conductor such as carbon is increased, the thickness increases largely so that the reaction resistance Rr does not decrease, whereby an increase in the power is not observed. On the other hand, if only catalyst metal particles are used, the viscosity of the coating solution is too low so that the infiltration of the solution into the electrode substrate increases. The dispersibility of the catalyst metal particles is also poor so that the reaction resistance Rr does not lower and the power does not increase easily. Thus, when metal catalyst particles are combined with a product wherein metal catalyst particles are carried on an electron conductor such as carbon as described above, an increase in the thickness is restrained and further the amount of the catalyst can be increased. It is therefore possible to realize a fall in the reaction resistance Rr to improve the power.

The MEA of the present invention will be more specifically described hereinafter.

In the invention, its anode catalyst layer is composed mainly of a catalyst, an electron conductor, and a polymer such as a proton conductor.

It is presumed that if the anode catalyst layer is too thick, fuel, water and hydrogen is hindered from being supplied and generated carbon dioxide is hindered from being exhausted so as to increase the reaction resistance Rr. Accordingly, the thickness of the anode catalyst layer is preferably 150 μm or less, more preferably 100 μm or less, even more preferably 30 μm or less. On the other hand, if the thickness of the anode catalyst layer is too small, the catalyst is not easily dispersed evenly into the anode. Accordingly, the thickness is preferably 1 μm or more, more preferably 5 μm or more, even more preferably 10 μm or more.

The thickness of the anode catalyst layer can be checked by, for example, the following method. A scanning electron microscope (SEM) or a transmission electron microscope (TEM) is used to observe 5 or more sections thereof per cm at about 100 to 1000 magnifications. At each of the observed sections, thicknesses at 5 or more points are measured. The average thereof is used as a typical value at each of the observed sections. The average of the resultant typical values is defined as the thickness of the anode catalyst layer. In the case of a multilayer structure having catalyst layers and carbon layer or the like, an SEM is combined with an electron probe microanalyzer (EPMA) to specify a domain wherein the catalyst is present and then the thickness thereof is obtained in the same way as described above.

Preferred examples of the catalyst used in the anode include particles of noble metals such as platinum. The electrocatalyst layer preferably contains a material for improving the electroconductivity of this layer. The form thereof is not particularly limited. For example, the layer preferably contains electroconductive particles. The electroconductive particles may be made of carbon black or the like. It is particularly preferred to use platinum-carried carbon as catalyst-carried carbon black. The electrocatalyst layer is desired to have a structure in which a catalyst, an electron conductor (such as carbon black), and an ion conductor (such as a proton exchangeable resin) contact each other so that an electrode active material and a reaction product come into the layer and go out therefrom effectively. It is effective that the electrocatalyst layer is made of a polymer compound in order to improve the ion conductivity, improve the bondability of the materials or make the water repellency higher. It is therefore preferred that the electrocatalyst layer contains at least catalyst particles, electroconductive particles and a polymer compound.

It is preferred to use, as the catalyst contained in the electrocatalyst layer, a metal catalyst such as platinum, palladium, ruthenium, iridium, gold or iron. The layer may contain two or more out of these elements, such as an alloy or mixture of these noble metal catalysts. For example, a combination of platinum with ruthenium or platinum with iron is preferably used. The catalyst may be carried on the surface of an electron conductor such as carbon black in order to make the surface area of the catalyst large and make the preparation of a coating solution therefor easy. In order to make the anode catalyst layer thin, it is more advantageous to use metal particles of the catalyst; however, according to only the metal particles, the viscosity of a coating solution therefor is too low so that the infiltration thereof into the electrode substrate increases. Consequently, the reaction resistance Rr increases. On the other hand, according to only a catalyst carried on the surface of the electron conductor, the catalyst layer becomes too thick so that the reaction resistance Rr increases. If the reaction resistance Rr is set to a value less than one, it is preferred to combine one or more products wherein a metal catalyst is carried on the surface of an electron conductor with one or more catalysts made only of metal particles.

It is preferred to use, as such a catalyst, a platinum-containing catalyst, such as "HiSPEC" 1000, "HiSPEC" 2000, "HiSPEC" 3000, "HiSPEC" 4000, "HiSPEC" 5000, "HiSPEC" 6000, "HiSPEC" 7000, "HiSPEC" 8000, or "HiSPEC" 9000, manufactured by Johnson Matthey Co. ("HiSPEC" is a registered trademark.); IFPC40-A, IFPC40-AII, IFPC40-AIII, IFPC30-A, IFPC30A-II, or IFPC30A-III, manufactured by ISHIFUKU Metal Industry Co., Ltd.; or TEC61V33, TEC61E54, TEC10V20E, TEC10V22E, TEC10V30E, TEC10V40E, or TEC10V50E, manufactured by Tanaka Kikinzoku Kogyo K.K. According to more preferred embodiments, these are combined and used. According to a combination of a catalyst made only of metal particles with a catalyst carried on the surface of an electron conductor, such as a combination of HiSPEC (registered trademark) 6000 with HiSPEC (registered trademark) 7000 or a combination of HiSPEC (registered trademark) 6000 with IFPC40A-II, the catalyst layer can be made thin and further the viscosity of a coating solution therefor can easily be adjusted.

In order to make the reaction resistance Rr low to obtain a high power, platinum is contained preferably in an amount of 0.1 $mg/cm^2$ or more. The amount of platinum is more preferably 0.5 $mg/cm^2$, even more preferably 1.5 $mg/cm^2$ or more. However, platinum is an expensive catalyst; therefore, if the amount is too large, costs therefor are too high. Thus, the amount of platinum is preferably 25 $mg/cm^2$ or less, more preferably 5 $mg/cm^2$ or less, even more preferably 4 $mg/cm^2$ or less. The amount of platinum can be checked by, for example, the following method. First, the area of the catalyst layer is measured. Next, the electrode substrate is peeled off from the MEA and the catalyst layer is scratched off to measure the amount of the catalyst layer. The catalyst layer is dissolved in a polar solvent such as dimethylformamide, and then the solution is separated into a solution portion and an insoluble portion by centrifugation, filtration or the like. The insoluble portion is subjected to solvent-substitution with a low boiling point solvent, and then dried. The amount thereof is then measured. Thereafter, the insoluble portion is analyzed by an atomic absorption method, fluorescent X-ray or ICP emission spectroscopy, or some other analysis. In this way, the total amount of platinum in the catalyst layer is obtained. When this total amount of platinum is divided by the area of the catalyst, the amount of platinum per unit area is obtained. The amount can also be obtained by analyzing the scratched-off catalyst layer, as it is, by fluorescent X-ray or ICP emission spectroscopy, or some other analysis.

In the anode catalyst layer used in the invention, the amount of platinum per micrometer of the thickness is preferably 0.07 mg/cm$^2$ or more. If the amount of platinum per micrometer of the thickness is less than this, the density of platinum is small so that the reaction resistance Rr may become large.

In the anode catalyst layer used in the invention, the platinum amount is more preferably 0.5 mg/cm$^2$ or more and 5 mg/cm$^2$ or less and the thickness of the anode catalyst layer is more preferably 1 µm or more and 30 µm or less. Even more preferably, the platinum amount is 1.5 mg/cm$^2$ or more and 4 mg/cm$^2$ or less and the thickness of the anode catalyst layer is 5 µm or more and 30 µm or less, whereby the reaction resistance Rr becomes low to improve the power. This would be based on the following reason: an increase in the supplied fuel amount per unit area or an increase in the exhausted product amount, based on the matter that the thickness of the anode catalyst layer is small, can be made compatible with an increase in reaction sites, based on the matter that the catalyst amount per unit area is large.

The electron conductor (electroconductive material) contained in the anode catalyst layer is preferably an inorganic electroconductive material from the viewpoint of electron conductivity and corrosion resistance and is, in particular, a carbonaceous material such as carbon black or a graphitic or carbonic material, or a metal or semimetal. As the carbonaceous material, carbon black such as channel black, thermal black, furnace black or acetylene black is preferably used. Examples of furnace black include "Vulcan" (registered trademark) XC-72R, "Vulcan" (registered trademark) P, Black Pearls (transliteration) 880, Black Pearls (transliteration) 1100, Black Pearls (transliteration) 1300, Black Pearls (transliteration) 2000, and Regal 400, manufactured by Cabot Co.; "Ketjen Black" (registered trademark) EC, manufactured by International Co.; and #3150 and #3250, manufactured by Mitsubishi Chemical Co., Ltd. An example of acetylene black is Denka Black (registered trademark), manufactured by Denki Kagaku Kogyo Kabushiki Kaisha. Besides carbon black, the following may be used: natural graphite; artificial graphite obtained from an organic compound such as pitch, coke, polyacrylonitrile, phenol resin or furan resin; or carbon. The form of these carbonaceous materials may be in the form of particles or fiber, and is not particularly limited. carbonaceous materials obtained by post-treating these carbonaceous materials may be used. Of such carbonaceous materials, "Vulcan" (registered trademark) XC-72R manufactured by Cabot Co. is preferably used, in particular, from the viewpoint of the electron conductivity thereof.

If the amount of the carbonaceous material in the anode catalyst layer is small, the electron resistance thereof is high. If the amount is large, the gas permeability is hindered and the availability of the catalyst lowers. These may cause a fall in performances of the electrode. Accordingly, the amount is preferably 0.1 mg/cm$^2$ or more and 5 mg/cm$^2$ or less, more preferably 0.5 mg/cm$^2$ or more and 1 mg/cm$^2$ or less.

If the amount of the carbonous material in the anode catalyst layer is small, the electron resistance thereof is high. If the amount is large, the gas permeability is hindered and the availability of the catalyst lowers. These may cause a fall in performances of the electrode. Accordingly, the amount is preferably 0.1 mg/cm$^2$ or more and 5 mg/cm$^2$ or less, more preferably 0.5 mg/cm$^2$ or more and 1 mg/cm$^2$ or less.

According to another preferred embodiment, a catalyst-carried carbon wherein a catalyst is integrated with an electron conductor is used. The use of this catalyst-carried carbon causes an improvement in the utilization efficiency of the catalyst so as to make it possible to contribute to a reduction in costs. In the case that the catalyst-carried carbon is used in the anode catalyst layer, it is allowable to add thereto a conductant agent as well. As such a conductant agent, the above-mentioned carbon black is preferably used.

The amount of the carbonaceous material in the anode catalyst layer can be obtained by the same method for obtaining the amount of platinum in the anode catalyst layer. For example, the amount can be checked as follows. First, the area of the anode catalyst layer is measured. Next, the electrode substrate is peeled off from the MEA and the catalyst layer is scratched off to measure the amount of the catalyst layer. The catalyst layer is dissolved in a polar solvent such as dimethylformamide, and then the solution is separated into a solution portion and an insoluble portion by centrifugation, filtration or the like. The insoluble portion is subjected to solvent-substitution with a low boiling point solvent, and then dried. The amount thereof is then measured. Thereafter, the insoluble portion is analyzed by an atomic absorption method, fluorescent X-ray or ICP emission spectroscopy, or some other analysis. In this way, the amount of metals in the insoluble portion is obtained. The remaining amount is the amount of carbon. When the obtained carbon amount is divided by the area of the catalyst layer, the amount of carbon per unit area is obtained.

An ion conductor can be used in the anode catalyst layer. In general, various organic materials or inorganic materials are known as ion conductors. In the case that an ion conductor is used in the fuel cell, this ion conductor is preferably a polymer having an ion exchangeable group such as a sulfonic acid group, a carboxylic acid group or a phosphonic acid group for improving the conductivity of protons. Specifically, preferred are polymers having a cation exchangeable functional group used in a polymer electrolyte membrane which will be detailed later. In particular, it is preferred to use a polymer having a proton exchangeable group composed of a fluoroalkyl ether side chain and a fluoroalkyl main chain, or a hydrocarbon-based polymer having a proton exchangeable group and having, as its main skeleton, a heat-resistant or oxidization-resistant polymer. For example, the following is preferably used: "Nafion" (registered trademark) manufactured by Du Pont Co., "Aciplex" (registered trademark) manufactured by Asahi Chemical Co., Ltd., "Flemion" (registered trademark) manufactured by Asahi Glass Co., Ltd., or the like. The ion conductor is incorporated, in a solution or dispersion form, into the anode catalyst layer. The solvent in which the polymer is dissolved or dispersed at this time is not particularly limited. From the viewpoint of the solubility of the ion conductor, a polar solvent is preferably used.

It is preferred from the viewpoint of performances of the electrode that the ion conductor is beforehand added to a solution made mainly of electrode catalyst particles and an electron conductor, which may be referred to as an anode solution, at the time of forming the anode catalyst layer and then this solution is applied in the state that the ion conductor is evenly dispersed. However, the ion conductor may be applied after the anode catalyst layer is applied. Examples of the method for applying the ion conductor onto the anode catalyst-layer include spray coating, brush painting, dip coating, die coating, curtain coating, and flow coating.

If the amount of the ion conductor contained in the anode catalyst layer is too small, the ion conductance is low. If the amount is too large, the fuel or gas permeability falls. In both the cases, the reaction resistance Rr appears to be increased. Accordingly, the amount of the ion conductor is preferably 0.1 mg/cm$^2$ or more and 15 mg/cm$^2$ or less, more preferably 0.5 mg/cm$^2$ or more and 5 mg/cm$^2$ or less, even more preferably 0.5 mg/cm$^2$ or more and 3 mg/cm$^2$ or less. The amount of the ion conductor can be checked as follows. First, the area of the catalyst layer is measured. Next, the electrode substrate is peeled off from the MEA and the catalyst layer is scratched off to measure the amount of the catalyst layer. The catalyst layer is dissolved in a polar solvent such as dimethylformamide, and then the solution is separated into a solution portion and an insoluble portion by centrifugation, filtration or the like. The solvent is removed from the solution portion, and the amount of the ion conductor is measured. When the ion conductor amount is divided by the area of the catalyst layer, the ion conductor amount per unit area is obtained.

The anode catalyst layer may contain various materials besides the above-mentioned catalyst, electron conductor and the polymer such as the ion conductor. It is particularly preferred that the anode catalyst layer contains a polymer other than the ion conductor in order to improve the bondability of the materials contained in the anode catalyst layer. Such a polymer may be a polymer containing a fluorine atom. For example, the following may be used: poly(vinyl fluoride) (PVF), poly(vinylidene fluoride) (PVDF), polyhexafluoropropylene (FEP), polytetrafluoroethylene, polyperfluoroalkyl vinyl ether (PFA), a copolymer thereof, or a copolymer or blend made from a monomer unit constituting these polymers and another monomer such as ethylene or styrene.

The content of the polymer(s) in the anode catalyst layer is preferably from 1 to 70% by weight, more preferably from 5 to 40% by weight of the anode catalyst layer. If the polymer content is too large, electron and ion resistances increase so that performances of the electrode may lower. However, in order to improve the endurance of the MEA, the whole of the polymer(s) in the catalyst layer can be made of one or more polymers other than ion conductors as described above.

In the invention, the amount of platinum, per ionic group amount, in the anode catalyst layer is 0.5 g/mmol or more and 10.0 g/mmol or less, more preferably 0.5 g/mmol or more and 5.0 g/mmol or less. This is because the amount largely affects the conductivity of ions in the catalyst layer to produce a large effect on the reaction resistance Rr or the power. The amount of platinum per ionic group amount can be obtained as follows.

(1) Weighing of the Electrocatalyst Layer

The weight of the electrocatalyst layer is measured. In the case that the electrocatalyst layer is integrated as the membrane electrode assembly at this time, the electrocatalyst layer is physically stripped. In the case that an electroconductive layer containing no electrode catalyst is formed between the electrocatalyst layer and the electrode substrate, a cross section thereof is subjected to elementary analysis to grasp the thickness of the electrocatalyst layer. The electrocatalyst layer is then separated by scratching off the surface by the corresponding thickness.

(2) Measurement of Ionic Group Amount

1) The electrocatalyst layer the weight of which is measured is immersed into a 1 N solution of NaCl in water, and the solution is stirred at a temperature of 20 to 25° C. for 24 hours or more.

2) The solution stirred for 24 hours or more in the item 1) is subjected to centrifugation or filtration to separate solid contents therefrom. The volume of the supernatant thereof is measured.

3) The measured solution is titrated with a solution of sodium hydroxide in water. The titration amount obtained at this time is the anionic group amount (mol number) contained in the immersed electrocatalyst layer. The measured anionic group amount (mol number) is divided by the amount (weight) of the electrocatalyst layer so as to give the mol number of the anionic groups per weight of the electrocatalyst.

4) In the items 2) and 3), the amount of the 1 N solution of NaCl in water and the normality of the solution of sodium hydroxide are appropriately adjusted.

(3) Platinum Amount Per Ionic Group

1) Separately, the amount of platinum in the catalyst layer is obtained by the above-mentioned method, and the amount is divided by the ionic group amount obtained previously. In this way, it is obtained.

According to a preferred embodiment of the invention, the anode catalyst layer has a three-dimensional network structure. This is in a state that the catalyst layer has a structure of a three-dimensionally connected net.

When the anode catalyst layer has the three-dimensional network structure in the invention, the diameter of pores therein is preferably from 0.05 to 5 µm, more preferably from 0.1 to 1 µm. The pore diameter can be obtained by averaging diameters of 20 or more, preferably 100 or more pores from a photo wherein the surface is photographed with a scanning electron microscope (SEM). Usually, the pore diameter is obtained by averaging diameters of 100 pores. An anode catalyst layer having a porous structure and produced by a wet coagulation method has a broad pore diameter distribution; therefore, it is preferred to average the diameters of pores the number of which is as large as possible, preferably from 100 to 500.

The porosity of the three-dimensional structure of the anode catalyst layer is preferably in the range of 10 to 95%. The porosity is more preferably in the range of 50 to 90%. Herein, the porosity is obtained by subtracting the volume of the catalyst-polymer composite from the total volume of the anode catalyst layer, dividing the resultant value by the total volume of the anode catalyst layer and then representing the resultant value by percentage (%).

The anode catalyst layer having a three-dimensional network structure is usually formed by applying a catalyst layer onto an electrode substrate, a proton exchangeable membrane and a substrate different therefrom and then subjecting the resultant to wet coagulation. When the porosity of the anode catalyst layer is not easily obtained independently, the porosity of the electrode substrate, the proton exchangeable membrane and the different substrate is obtained in advance. The porosity of the product including these substrates and the anode catalyst layer is obtained and then the porosity of the anode catalyst layer alone may be obtained.

The anode catalyst layer having a three-dimensional network structure is large in porosity, and good in gas diffusivity, exhaustability of generated water, electron conductivity and proton conductivity. For conventional methods for making pores, the particle diameter of a catalyst or that of an added polymer is made large, or pores are made by use of a pore-making agent. However, according to such methods for making pores, the contact resistance between catalyst-carried carbons or between proton exchangeable resins becomes larger than the anode catalyst layer. On the other hand, in the three-dimensional network structure based on wet coagulation, the polymer composite containing catalyst-carried carbon is in the form of the three-dimensional network; therefore, this polymer composite conducts electrons and protons easily. Moreover, this structure is a finely porous structure; therefore, this is a structure good in gas diffusivity and exhaustability of generated water. Thus, this structure is a preferred structure.

In the case that the anode catalyst layer has a three-dimensional structure, it is possible as well to use, as materials used for the catalyst, electron conductor and ion conductor therein, the same materials as used in the conventional art. However, when the anode catalyst layer having a three-dimensional structure is formed, the use of wet coagulation is preferred. It is therefore preferred that a polymer suitable for this wet coagulation method is selected and the layer contains a polymer which is capable of dispersing catalyst particles well and is not deteriorated by the oxidization-reduction atmosphere in the fuel cell. Such a polymer may be a polymer containing fluorine atoms, and is not particularly limited. For example, the following are preferably used: poly(vinyl fluoride) (PVF), poly(vinylidene fluoride) (PVDF), polyhexafluoropropylene (FEP), polyperfluoroalkyl vinyl ether (PFA), a copolymer thereof, or a copolymer or blend made from a monomer unit constituting these polymers and another monomer such as ethylene or styrene (an example of the copolymer including hexafluoropropylene-vinylidene fluoride copolymer).

Of these, poly(vinylidene fluoride) (PVDF) and hexafluoropropylene-vinylidene fluoride copolymer are particularly preferred polymers since the polymers can give a catalyst layer having a three-dimensional network structure by a wet coagulation method using a nonprotonic polar solvent as a dissolving solvent and using a protonic polar solvent as a coagulating solvent.

Specific examples of the solvent for the polymer include N-methylpyrrolidone (NMP), dimethylformamide (DMF), dimethylacetoamide (DMAC), propylene carbonate (PC), and dimethylimidazolidinone (DMI). Examples of the coagulating solvent include water, lower alcohols such as methanol, ethanol and isopropanol, esters such as ethyl acetate and butyl acetate, and various aromatic or halogen-containing organic solvents.

The anode catalyst layer used in the invention can be produced by a known method, which is not particularly limited. The following will describe specific examples of the method for forming the anode catalyst layer. A coating solution for the anode catalyst can be kneaded with/by three rolls, ultrasonic waves, a homogenizer, a wet jet mill, a dry jet mill, a mortar, stirring fans, a satellite (autorotational and revolutionary type) stirrer, or the like. The kneaded anode catalyst coating solution is applied by means of a knife coater, a bar coater, a spray, a dip coater, a spin coater, a roll coater, a die coater, a curtain coater, a flow coater or the like, and then dried to form the layer. The method for the application is appropriately selected in accordance with the viscosity of the coating solution, solid contents therein or the like. The anode catalyst layer coating solution may be applied to either of an electrode substrate or a polymer electrolyte membrane, which will be described later. The catalyst layer may be formed alone. The coating solution is applied on a glass substrate or the like, dried and then peeled therefrom. Furthermore, a separately-formed anode catalyst layer may be transferred onto an electrode substrate or a polymer electrolyte or sandwiched therebetween. The transfer substrate used in this case may be a sheet made of polytetrafluoroethylene (PTFE), a glass or metal plate the surfaces of which are treated with fluorine or a silicone releasing agent, or the like.

The anode catalyst layer having a three-dimensional network structure is preferably formed by a wet coagulation method. In this case, an anode catalyst coating solution is applied, and then this applied layer is brought into contact with a solvent for coagulating the polymer in the catalyst coating solution, so that the coagulation/precipitation of the anode catalyst coating solution and solvent extraction can be simultaneously carried out. It is important for the catalyst coating solution that the catalyst is well dispersed. In the wet coagulation, the solvent therefor is very important for forming the three-dimensional network structure. The coagulating solvent is preferably a solvent which causes coagulation/precipitation of the anode catalyst coating solution easily and is compatible with the solvent in the coating solution. The method for bringing the electrode substrate into contact with the coagulating solvent is not particularly limited, and the following may be used: a method of immersing the electrode substrate, as it is, into the coagulating solvent, a method of bringing only the applied layer into contact with the liquid surface of the coagulating solvent, a method of showering or spraying the coagulating solvent onto the applied layer, or some other method.

The electrode substrate onto which this anode catalyst coating solution is applied, that is, either of the electrode substrate or the polymer electrolyte can be subjected to wet coagulation after the coating solution is applied thereto. It is also allowable to apply the coating solution onto a substrate (e.g., a transfer substrate) different from the electrode substrate and the polymer electrolyte, subjecting the resultant to wet coagulation to form a three-dimensional network structure, and then transfer this anode catalyst layer onto the electrode substrate or the polymer electrolyte or sandwich the anode catalyst layer therebetween. The transfer substrate used in this case may be a sheet made of polytetrafluoroethylene (PTFE), a glass or metal plate the surfaces of which are treated with fluorine or a silicone releasing agent, or the like.

The ratio of the catalyst to the ion conductor in the anode catalyst layer should be appropriately decided in accordance with required electrode characteristics, and is not particularly limited. The ratio by weight of the catalyst to the ion conductor is preferably from 5/95 to 95/5. When the anode catalyst layer is used as an anode catalyst layer for polymer electrolyte membrane fuel cell, the ratio by weight of the catalyst to the ion conductor is preferably in the range of 40/60 to 85/15.

Various additives may be added to the anode catalyst layer. Examples thereof include a conductant agent such as carbon for improving electron conductivity, a polymer for improving bonding power, and an additive for controlling the diameter of pores in the three-dimensional network structure. These can be used without any especial limitation. The added amount of these additives is preferably from 0.1 to 50% by weight, more preferably from 1 to 20% by weight of the catalyst-polymer composite.

The method for producing the anode catalyst layer having a three-dimensional network structure is preferably a method based on wet coagulation. In this case, an anode catalyst coating solution is applied, and then this applied layer is brought into contact with a solvent for coagulating the polymer in the catalyst coating solution, so that the coagulation/precipitation of the anode catalyst coating solution and solvent extraction can be simultaneously carried out. It is important for the catalyst coating solution that the catalyst is well dispersed. If the dispersion state thereof is bad, a three-dimensional network structure may not be formed when the solution is subjected to wet coagulation.

About the method for applying the anode catalyst coating solution, a coating method dependent on the viscosity of the coating solution, solid contents therein or the like is selected. The following method is used: a coating method using a knife coater, a bar coater, a spray, a dip coater, a spin coater, a roll coater, a die coater, a curtain coater, or the like.

The coagulating solvent is not particularly limited, and is preferably a solvent which causes coagulation/precipitation of the anode catalyst coating solution easily and is compatible with the solvent in the coating solution. The method for bringing the electrode substrate into contact with the coagulating solvent is not particularly limited, and the following may be used: a method of immersing the electrode substrate, as it is, into the coagulating solvent, a method of bringing only the applied layer into contact with the liquid surface of the coagulating solvent, a method of showering or spraying the coagulating solvent onto the applied layer, or some other method.

The electrode substrate onto which the anode catalyst coating solution is applied, that is, either of the electrode substrate or the polymer electrolyte can be subjected to wet coagulation after the coating solution is applied thereto. It is also allowable to apply the anode catalyst coating solution onto a substrate (e.g., a transfer substrate) different from the electrode substrate and the polymer electrolyte, subjecting the resultant to wet coagulation to form a three-dimensional network structure, and then transfer this anode catalyst layer onto the electrode substrate or the polymer electrolyte or sandwich the anode catalyst layer therebetween. The transfer substrate used in this case may be a sheet made of polytetrafluoroethylene (PTFE), a glass or metal plate the surfaces of which are treated with fluorine or a silicone releasing agent, or the like.

The cathode catalyst layer used in the invention is composed mainly of a catalyst, an electron conductor, and a polymer such as a proton conductor, similarly to the anode catalyst layer. The cathode catalyst layer used in the invention is not particularly limited. The same techniques for the anode catalyst layer can be applied thereto.

If the cathode catalyst layer is too thick, the air is hindered from being supplied or generated water is hindered from being exhausted so that the reaction resistance Rr may increase. Accordingly, the thickness of the cathode catalyst layer is preferably 500 µm or less, more preferably 100 µm or less, even more preferably 40 µm or less, even more preferably 30 µm or less. If the thickness of the cathode catalyst layer is too small, it is difficult that the catalyst is evenly dispersed in the cathode. Accordingly, the thickness of the cathode catalyst layer is preferably 1 µm or more, more preferably 5 µm or more, even more preferably 10 µm or more. In connection with the thickness of the cathode catalyst layer, a scanning electron microscope (SEM) or a transmission electron microscope (TEM) is used to observe or more sections thereof per cm at about 100 to 1000 magnifications. At each of the observed sections, thicknesses at 5 or more points are measured. The average thereof is used as a typical value at each of the observed sections. The average of the resultant typical values is defined as the thickness of the cathode catalyst layer. In the case of a multilayer structure having catalyst layers and carbon layer or the like, an SEM is combined with an electron probe microanalyzer (EPMA) to specify a domain wherein the catalyst is present and then the thickness thereof is obtained in the same way as described above.

Preferred examples of the catalyst used in the cathode include particles of a noble metal such as platinum. The electrocatalyst layer preferably contains a material for improving the electroconductivity of this layer. The form thereof is not particularly limited. For example, the layer preferably contains electroconductive particles. The electroconductive particles may be made of carbon black or the like. It is particularly preferred to use platinum-carried carbon as catalyst-carried carbon black. The electrocatalyst layer is desired to have a structure in which a catalyst, an electron conductor (such as carbon black), and an ion conductor (such as a proton exchangeable resin) contact each other so that an electrode active material and a reaction product come into the layer and go out therefrom effectively. It is effective that the electrocatalyst layer is made of a polymer compound in order to improve the ion conductivity, improve the bondability of the materials or make the water repellency higher. It is therefore preferred that the electrocatalyst layer contains at least catalyst particles, electroconductive particles and a polymer compound.

It is preferred to use, as the catalyst contained in the electrocatalyst layer of the cathode, a metal catalyst such as platinum, palladium, ruthenium, iridium, gold or iron. The catalyst may be a catalyst comprising two or more out of these elements, such as an alloy or mixture of these noble metal catalysts. For example, a combination of platinum with ruthenium or platinum with iron is preferably used. The catalyst may be carried on the surface of an electron conductor such as carbon black in order to make the surface area of the catalyst large and make the preparation of a coating solution therefor easy. It is preferred to use, as such a catalyst, a platinum-containing catalyst, such as "HiSPEC" 1000, "HiSPEC" 2000, "HiSPEC" 3000, "HiSPEC" 4000, "HiSPEC" 5000, "HiSPEC" 6000, "HiSPEC" 7000, "HiSPEC" 8000, or "HiSPEC" 9000, manufactured by Johnson Matthey Co. ("HiSPEC" is a registered trademark); IFPC40-A, IFPC40A-II, IFPC40A-III, IFPC30-A, IFPC30A-II, or IFPC30A-III, manufactured by ISHIFUKU Metal Industry Co., Ltd.; or TEC61V33, TEC61E54, TEC10V20E, TEC10V22E, TEC10V30E, TEC10V40E, or TEC10V50E, manufactured by Tanaka Kikinzoku Kogyo K.K. These may be combined and used. According to a combination of a catalyst made only of metal particles with a catalyst carried on the surface of an electron conductor, such as a combination of "HiSPEC" 6000 with "HiSPEC" 7000, that of "HiSPEC" 6000 with IFPC40A-II, that of "HiSPEC" 1000 with "HiSPEC" 8000, that of "HiSPEC" 1000 with TEC10V50E, or that of "HiSPEC" 6000 with "HiSPEC" 10000 ("HiSPEC" is a registered trademark), the catalyst layer can be made thin and further the viscosity of a coating solution therefor can easily be adjusted.

The cathode catalyst layer preferably contains platinum. The amount of platinum is preferably 0.1 mg/cm$^2$ or more, more preferably 0.5 mg/cm$^2$, even more preferably 1 mg/cm$^2$ or more, even more preferably 3 mg/cm$^2$ or more. On the other hand, if the amount of the platinum is too large, the cost therefor is too high since platinum is an expensive catalyst. Accordingly, the amount of platinum is preferably 25 mg/cm$^2$ or less, more preferably 8 mg/cm$^2$ or less, even more preferably 5 mg/cm$^2$ or less. The platinum amount in the cathode catalyst layer can be checked similarly to that in the anode catalyst layer. For example, the amount can be checked as follows. First, the area of the catalyst layer is measured. Next, the electrode substrate is peeled off from the MEA and the catalyst layer is scratched off to measure the amount of the catalyst layer. The catalyst layer is dissolved in a polar solvent such as dimethylformamide, and then the solution is separated into a solution portion and an insoluble portion by centrifugation, filtration or the like. The insoluble portion is subjected to solvent-substitution with a low boiling point solvent, and then dried. The amount thereof is then measured. Thereafter, the insoluble portion is analyzed by an atomic absorption method, fluorescent X-ray or ICP emission spectroscopy, or some other analysis. In this way, the total amount of platinum in the catalyst layer is obtained. When this total amount of platinum is divided by the area of the catalyst, the amount of platinum per unit area is obtained. The amount can also be obtained by analyzing the scratched-off catalyst layer, as it is, by fluorescent X-ray or ICP emission spectroscopy, or some other analysis.

In the cathode catalyst layer in the invention, the amount of platinum per micrometer of the thickness is preferably 0.15 mg/cm$^2$ or more. If the amount of platinum per micrometer is less than this, the density of platinum is small so that the reaction resistance Rr may become large.

In the cathode catalyst layer used in the invention, the platinum amount is preferably 1 mg/cm$^2$ or more and 8 mg/cm$^2$ or less and the thickness of the cathode catalyst layer is preferably 1 μm or more and 40 μm or less. Moreover, the platinum amount in the cathode catalyst layer is preferably 3 mg/cm$^2$ or more and 8 mg/cm$^2$ or less and the thickness of the cathode catalyst layer is preferably 5 μm or more and 30 μm or less. When the thickness of the cathode catalyst layer is made small and further the platinum amount therein is made large in this way, the reaction resistance Rr can be made low to improve the power. This would be based on the following reason: an increase in the supplied fuel amount per unit area or an increase in the exhausted product amount, based on the matter that the thickness is small, can be made compatible with an increase in reaction sites, based on the matter that the catalyst amount per unit area is large.

As the carrier of the cathode catalyst layer used in the invention, the same material as used in the anode catalyst layer can be used. In particular, carbon black, or a graphitic or carbonic carbonous material is preferably used.

In the invention, the cathode catalyst layer preferably contains a carbonaceous material in an amount of 0.1 mg/cm$^2$ or more and 5 mg/cm$^2$ or less. The amount of the carbonaceous material is more preferably 0.5 mg/cm$^2$ or more and 3 mg/cm$^2$ or less. If the carbonaceous material amount is small, the electron resistance becomes high. If the amount is large, the gas permeability is hindered or the availability of the catalyst lowers. In either case, performances of the electrode are made low. The carbonaceous material amount in the cathode catalyst layer can be obtained similarly to the platinum amount in the anode catalyst layer.

The ion conductor used in the cathode catalyst layer used in the invention may be the same as used in the anode catalyst layer. The amount of the ion conductor used in the cathode catalyst layer in the invention is preferably 0.1 mg/cm$^2$ or more and 15 mg/cm$^2$ or less, more preferably 0.5 mg/cm$^2$ or more and 5 mg/cm$^2$ or less, even more preferably 0.5 mg/cm$^2$ or more and 3 mg/cm$^2$ or less. This would be based on the following reasons: if the amount of the used conductor is too small, the ion conductivity is low; if the amount is too large, the fuel or gas permeability is lowered; and in either case, the Rr is increased. The amount of the ion conductor can be checked in the same way for checking that in the anode catalyst layer.

The cathode catalyst layer used in the invention may contain the same various materials as contained in the anode.

The ratio of the catalyst to the ion conductor in the cathode catalyst layer used in the invention is appropriately decided in accordance with required electrode characteristics. The ratio by weight of the catalyst to the ion conductor is preferably from 5/95 to 95/5. In particular, when it is used as a cathode catalyst layer for polymer electrolyte membrane fuel cell, the ratio by weight of the catalyst to the ion conductor is preferably in the range of 40/60 to 85/15.

The amount of platinum, per ionic group amount, in the cathode catalyst layer used in the invention is 0.5 g/mmol or more and 10.0 g/mmol or less, more preferably 0.5 g/mmol or more and 5.0 g/mmol or less. This is because the amount largely affects the conductivity of ions in the catalyst layer to produce a large effect on the reaction resistance Rr or the power. The amount of platinum per ionic group amount can be obtained in the same way for obtaining that in the anode catalyst layer.

The cathode catalyst layer used in the invention can be formed by the same method for forming the anode.

In the polymer electrolyte membrane fuel cell of the invention, the electrode substrate is not particularly limited, and may be any known material.

The electrode substrate used in the invention is preferably a substrate which is low in electric resistance and can attain power collection (feeding). The constituent material of the electrode substrate may be, for example, a substance made mainly of an electroconductive inorganic material. Examples of this electroconductive inorganic material include a fired product made from polyacrylonitrile, a fired product made from pitch, a carbonous material such as graphite or swelling graphite, stainless steel, molybdenum, and titanium.

The form of the electroconductive inorganic material for the electrode substrate may be, for example, a fibrous form or a granular form. From the viewpoint of the gas permeability thereof, preferred is a fibrous electroconductive inorganic material (inorganic electroconductive fiber), in particular, carbon fiber. The electrode substrate wherein the inorganic electroconductive fiber can be used may have either of a woven cloth structure or a nonwoven cloth structure. For example, carbon paper TGP series and SO series, manufactured by Toray Industries, Inc., and carbon cloths manufactured by E-TEK Co. in USA can be used.

As the woven cloth, a dishcloth having a plain weave, twill weave, sateen weave, figured cloth, or tsuzure fabric (weave) structure is used without any especial limitation. As the nonwoven cloth, dishcloths based on a papermaking method, a needle punch method, a spun bond method, a water jet punch method and a melt blow method are used without any especial limitation. The electrode substrate may be knitting. In particular, as the dishcloth wherein carbon fiber is used out of these dishcloths, the following is preferably used: woven cloth obtained by carbonizing or graphitizing plain weave using flame-resistant spun yarn; nonwoven cloth obtained by processing flame-resistant yarn into nonwoven cloth by a needle punch method, a water jet punch method, or the like, and then carbonizing or graphitizing the resultant nonwoven cloth; mat nonwoven cloth obtained by a papermaking method using flame-resistant yarn, carbonized yarn, or graphitized yarn; or the like. In particular, nonwoven cloth is preferably used since a thin and strong dishcloth can be obtained.

In the case that inorganic electroconductive fiber made of carbon fiber is used in the electrode substrate, preferred examples of the used carbon fiber include polyacrylonitrile (PAN) based carbon fiber, phenol based carbon fiber, pitch based carbon fiber, and rayon based carbon fiber. Of these, PAN based carbon fiber is preferably used. This is because PAN based carbon fiber generally has larger compression strength and tension fracture elongation than pitch based carbon fiber, so as not to be easily fractured. In order to obtain carbon fiber which is not easily fractured, the carbonizing temperature for the carbon fiber is preferably set to 2,500° C. or lower. The carbonizing temperature is more preferably 2,000° C. or lower.

According to a preferred embodiment of the invention, the electrode substrate used in the polymer electrolyte membrane fuel cell thereof is subjected to water-repellence treatment for preventing a fall in the gas diffusivity and permeability based on the residence of water, is subjected to partial water-repellence treatment or hydrophilicity treatment for forming a water-discharging channel, or is subjected to addition of carbon powder for making the resistance low.

In the case that the polymer electrolyte membrane fuel cell of the invention has a side-by-side structure, a diffusion layer is formed therein in order to promote the inflow of a fuel such as hydrogen or an aqueous solution of methanol, or the air, or the exhaust of a generated product such as water or carbon dioxide according to a preferred embodiment. The above-mentioned electrode substrate also has the role of such a diffusion layer; however, a non-electroconductive dishcloth may be used as a diffusion layer. As the constituent material of the non-electroconductive dishcloth, for example, non-electroconductive fiber can be used without any especial limitation.

As the non-electroconductive fiber which constitutes the non-electroconductive dishcloth for the diffusion layer, for example, the following can be used: polytetrafluoroethylene (PTFE), tetrafluoroethylene-hexafluoroethylene copolymer (FEP), tetrafluoroethylene-perfluoroalkyl vinyl ether copolymer (PFA), tetrafluoroethylene-ethylene copolymer (ETFE), poly(vinylidene fluoride) (PVDF), poly(vinyl fluoride) (PVF), polychlorotrifluoroethylene (CTFE), chlorinated polyethylene, flame-resistant polyacrylonitrile, polyacrylonitrile, polyester, polyamide, polyethylene, polypropylene or the like. Of these non-electroconductive fibers, a fiber made of a fluorine-atom-containing polymer, such as PTFE, FEP, PFA, ETFE, PVDF, PVF or CTFE, is preferably used from the viewpoint of the corrosion resistance and other properties thereof at the time of electrode reaction.

As the non-electroconductive dishcloth for the diffusion layer, a dishcloth having either of a woven cloth structure or a nonwoven cloth structure can be used. As the woven cloth, a dishcloth having a plain weave, twill weave, sateen weave, figured cloth, or tsuzure fabric (weave) structure is used without any especial limitation. As the nonwoven cloth, dishcloths based on a papermaking method, a needle punch method, a spun bond method, a water jet punch method and a melt blow method are used without any especial limitation. The non-electroconductive dishcloth may be knitting. Of these dishcloths, in particular, the following is preferably used: plain weave; nonwoven cloth obtained by a needle punch method, a water jet punch method, or the like; mat nonwoven cloth obtained by a papermaking method; or the like. In particular, nonwoven cloth is preferably used since a porous, thin and strong dishcloth can be obtained.

According to a preferred embodiment, the non-electroconductive dishcloth for the diffusion layer is subjected to water-repellence treatment for preventing a fall in the gas diffusivity and permeability based on the residence of water, or is subjected to partial water-repellence treatment or hydrophilicity treatment for forming a water-discharging channel. According to another preferred embodiment, the dishcloth is subjected to post-treatments such as heat treatment, drawing, and pressing. By these post-treatments, advantageous effects such as layer-thinning, an increase in the porosity, and an increase in the strength can be expected.

In the MEA of the invention, an electroconductive intermediate layer containing at least an inorganic electroconductive material and a hydrophobic polymer can be formed between the electrode substrate and the catalyst layer. In particular, when the electrode substrate is made of a carbon fiber woven cloth or nonwoven cloth having a large porosity, the formation of the electroconductive intermediate layer makes it possible to restrain a fall in the performances based on the infiltration of the catalyst layer into the electrode substrate.

The polymer electrolyte membrane, which may be abbreviated to the electrolyte membrane hereinafter, used in the invention is not particularly limited if the membrane is made of an electrolyte used in an ordinary fuel cell. A polymer having a cation exchangeable functional group is preferably used. Examples of such a functional group include a sulfonic acid group, a phosphoric acid group, a carboxylic acid group, and a phosphonic acid group from the viewpoint of proton conductivity thereof. The polymer may be a fluorine-containing resin, such as polytetrafluoroethylene (PTFE), polytetrafluoroethylene-perfluoroalkyl ether copolymer (PFA), polytetrafluoroethylene-hexafluoropropylene copolymer (FEP), tetrafluoroethylene-ethylene copolymer (ETFE) or poly(vinylidene fluoride) (PVDF); or a material having, as a main skeleton thereof, a heat resistant and antioxidant polymer, such as polyimide (PI), poly(phenylene sulfide sulfone) (PPSS), polysulfone (PSF), poly(phenylene sulfide) (PPS), poly(phenylene oxide) (PPO), poly(ether ketone) (PEK), poly(ether ether ketone) (PEEK), and polybenzoimidazole (PBI). As the proton conductor, the following proton exchangeable membrane also is in particular preferably used: "Nafion" (registered trademark) manufactured by Du Pont Co. and having a PTFE main chain and a polyperfluoroalkyl ether sulfonic acid as a side chain, "Aciplex" (registered trademark) manufactured by Asahi Chemical Co., Ltd., "Flemion" (registered trademark) manufactured by Asahi Glass Co., Ltd., or the like.

As described above, polymer electrolyte membranes are roughly classified into hydrocarbon based membranes each made of a styrene-divinylbenzene copolymer, a heat resistant engineering plastic, or the like that has an anionic group such as a sulfonic acid group, and perfluorinated copolymer membranes each composed of a fluoroalkyl ether side chain and a fluoroalkyl main chain. These should be appropriately selected in accordance with an application or environment wherein the fuel cell is used.

The polymer electrolyte membrane used in the invention is suitably a polymer electrolyte membrane containing non-freezing water the amount of which is within a specific range. Herein, water present in the polymer electrolyte membrane is classified into bulk water, the melting point of which is measured at 0° C. or higher, lower melting point water, the melting point of which is measured at a temperature lower than 0° C. and not lower than −30° C., and non-freeze water, the melting point of which cannot be measured at −30° C. or higher. The ratio between these waters, in particular, the ratio of the non-freeze water is controlled into a range represented by the following expression (1), thereby specifying the electroosmotic water amount:

(Ratio of the non-freeze water amount)=[(Amount of the non-freeze water)/(Amount of the lower melting point water+Amount of the non-freeze water)]×100(%)  (1)

The polymer electrolyte membrane can be classified into crosslinked type one or non-crosslinked type one. In the polymer electrolyte membrane of the crosslinked type, it is important that the ratio of the non-freeze water amount, represented by the numerical expression 1, is 20% or more by weight and 100% or less by weight. The ratio of the non-freeze water amount is more preferably 30% or more by weight and 99.9% or less by weight, even more preferably 40% or more by weight and 99.9% or less by weight. In the polymer electrolyte membrane of the non-crosslinked type, it is important that the ratio of the non-freeze water amount, represented by the numerical expression 1, is 60% or more by weight and 100% or less by weight. The ratio of the non-freeze water amount is more preferably 70% or more by weight and 99.9% or less by weight, even more preferably 80% or more by weight and 99.9% or less by weight. The above-mentioned non-free water amount and lower melting point water amount are values measured by methods which will be described later.

Furthermore, about the polymer electrolyte membrane, the content by percentage of the non-freeze water represented by the following expression (2) is preferably within a specific range:

(Content by percentage of the non-freeze water)= [(Non-freeze water amount in the polymer electrolyte membrane)/(Dry weight of the polymer electrolyte membrane)]×100(%)     (2)

In the case of the polymer electrolyte membrane of the crosslinked type, the content by percentage of the non-freeze water, represented by the expression (2), is preferably 5% or more and 200% or less. In the case of the polymer electrolyte membrane of the non-crosslinked type, the content by percentage is preferably 20% or more and 200% or less.

The non-freeze water amount in the polymer electrolyte membrane and the content by percentage of the non-freeze water therein can be obtained by differential scanning calorimetry (DSC) developed by Toray Research Center Inc.

About the kind of the polymer used in the polymer electrolyte membrane in the invention, particularly preferred is a hydrocarbon based polymer electrolyte which satisfies the above-mentioned characteristics and requirements, has an ionic group, and is excellent in hydrolysis resistance. Specific examples of the non-crosslinking polymer electrolyte membrane having such characteristics include ionic-group-containing aromatic hydrocarbon based polymers such as ionic-group-containing polyphenylene oxide, ionic-group-containing poly(ether ketone), ionic-group-containing poly(ether ether ketone), ionic-group-containing poly(ether sulfone), ionic-group-containing poly(ether ether sulfone), ionic-group-containing poly(ether phosphine oxide), ionic-group-containing poly(ether ether phosphine oxide), ionic-group-containing poly(phenylene sulfide), ionic-group-containing polyamide, ionic-group-containing polyimide, ionic-group-containing poly(ether imide), ionic-group-containing polyimidazole, ionic-group-containing polyoxazole, ionic-group-containing polyphenylene, ionic-group-containing polysulfone, and ionic-group-containing poly(phenylene sulfide sulfone). The ionic group is not particularly limited if the group is an atomic group having a negative charge. The group is preferably a proton exchangeable group. Examples of such a functional group include a sulfonic acid group, a sulfuric acid group, a sulfonimide group, a phosphonic acid group, a phosphoric acid group, and a carboxylic acid group.

As the crosslinked polymer electrolyte membrane, a crosslinked structure made mainly of a vinyl monomer is preferably used. Specific examples of the vinyl monomer include acrylic monomers such as acrylonitrile, aromatic vinyl monomers such as styrene, N-phenylmaleimide, N-isopropylmaleimide, N-cyclohexylmaleimide, N-benzylmaleimide, and fluorine-containing monomers such as 2,2,2-trifluoroethyl(meth)acrylate, 2,2,3,3-tetrafluoropropyl(meth)acrylate, 1H,1H,5H-octafluoropentyl(meth)acrylate and H,1H,2H,2H-heptadecafluorodecyl(meth)acrylate. Examples of a monomer having plural vinyl groups include aromatic polyfunctional monomers such as divinylbenzene; and di-, tri-, tetra-, penta-, and hexa-(meth)acrylates of a polyhydric alcohol, such as ethylene glycol di(meth)acrylate and bisphenoxyethanol (meth)fluorenediacrylate. A more preferred polymer electrolyte membrane can be produced by copolymerizing, in particular, the above-mentioned vinyl monomer therewith.

In the polymer which constitutes the polymer electrolyte membrane of the invention, it is preferred that the polymer molecular chain thereof is restricted. The method therefor is not particularly limited. When one or more polymers having proton conductivity and one or more polymers excellent in water resistance and solvent resistance are mixed with each other, restricting effect is exhibited. When they are mixed, it is particularly important that the respective polymers, specifically, the polymer(s) having proton conductivity and the polymer(s) excellent in water resistance and solvent property are compatible with each other. Restricting effect is obtained as well by a method based on crosslinking or an inter penetrated polymer network as well as mere mixing.

According to a preferred embodiment, the polymer electrolyte membrane used in the invention is an electrolyte membrane wherein an inorganic material is added to the above-mentioned hydrocarbon based polymer electrolyte membrane, or an electrolyte membrane made only of an inorganic material. Examples of the inorganic material include metal oxides such as alumina, silica, zeolite, titania, zirconia and ceria; and carbonaceous materials such as fullerenol.

For the polymer electrolyte membrane, a porous substrate may be used. The porous substrate preferably has a three-dimensionally network structure, or a through hole structure wherein holes extending from the right face of the membrane to the rear face thereof are independently present.

According to a further preferred embodiment of the polymer electrolyte membrane used in the invention, the polymer electrolyte membrane is covered with a metallic thin film in order to decrease the penetration of fuel methanol thereinto even further. Examples of such a metallic thin film include palladium, platinum and silver.

A known method can be applied to the method for producing the MEA of the invention. Preferably, members therefor are integrated with each other by hot pressing. The temperature and pressure therefor can be appropriately selected in accordance with the thickness and the porosity of the polymer electrolyte membrane, the catalyst layers, and the electrode substrates. Usually, the temperature is preferably from room temperature to 180° C., and the pressure is preferably from 10 to 150 kgf/cm$^2$.

In the polymer electrolyte membrane fuel cell of the invention, the reaction resistance Rr preferably satisfies the following expression:

$$-2 \leq \log Rr < 1$$

The reaction resistance Rr more preferably satisfies the following expression:

$$-1.5 \leq \log Rr \leq 0.5$$

The reaction resistance Rr even more preferably satisfies the following expression:

$$-1 \leq \log Rr \leq 0.3$$

According to the polymer electrolyte membrane fuel cell of the invention, the exhaust efficiency of a fuel or carbon dioxide or the supply efficiency of the fuel becomes good, the exhaust efficiency of water and the supply efficiency of air are improved and further log Rr can be set to less than 1, so that a high power can be obtained.

The reaction resistance Rr of the polymer electrolyte membrane fuel cell of the invention can be measured by the alternating current impedance method in the same manner as the reaction resistance Rr of the MEA. The polymer electrolyte membrane fuel cell is composed of a cell section and an auxiliary device. The cell section referred to herein is a section taking charge of actual power generation wherein the above-mentioned MEA's are arranged to give current collecting ends. The auxiliary device is composed of a section for a pump or blower for supplying a fuel to the cell section and removing or collecting a generated product; a section for controlling the concentration and the flow rate of the fuel or a section for controlling the driving state of the cell section and the whole of the cell; a section for controlling the electric current or voltage supplied to an instrument; and so on. At this time, the temperature of the polymer electrolyte membrane fuel cell is the temperature of the cell section, and is measured with a thermocouple or the like that is connected to the MEA or the portion where the MEA's are stacked. The atmosphere in the cell section is air-conditioned, thereby controlling the temperature. The reaction resistance Rr of the polymer electrolyte membrane fuel cell is measured at ends of the MEA inside the current collecting end polymer electrolyte membrane fuel cell in the cell section (in the case that the MEA's are arranged and stacked, the Rr is measured at ends of the stack). When an auxiliary device or a booster is used, the reaction resistance is measured about only the MEA, from which it is excluded. About the reaction resistance Rr of the polymer electrolyte membrane fuel cell, the area of the MEA is used and the resistance per unit area is rendered the Rr.

In the polymer electrolyte membrane fuel cell of the invention, the MEA of the invention can be used in order to make the reaction resistance Rr to satisfy: $-2 \leq \log Rr < 1$.

The polymer electrolyte membrane fuel cell of the invention may have, as its auxiliary device, a pump or blower for supplying a fuel or removing reactants, as described above, but is mainly composed of the MEA and a section for supplying reactants without having such a pump or blower. For the supply of the reactants, there may be used either of a system for supplying them forcibly with a pump or fans, or a fuel-supplying and product-exhausting system based on natural diffusion. According to a preferred embodiment of the polymer electrolyte membrane fuel cell of the invention, the cell has a booster system as its auxiliary device, as described above. Furthermore, the fuel cell may have a system for monitoring and adjusting the concentration of a fuel, or a system for collecting generated water.

It is preferred to use a plurality of the MEA's in the polymer electrolyte membrane fuel cell of the invention. These may be stacked or arranged into a plane form. When the polymer electrolyte membrane fuel cell is made small-sized, a method of arranging the MEA's into a plane form is preferred. When the MEA's are arranged into the plane form, it is allowable not to use any separator or auxiliary device.

The polymer electrolyte membrane fuel cell of the invention can be applied to any one of fuel cells wherein hydrogen is used as a fuel, and wherein an organic solvent such as methanol or dimethyl ether is used as a fuel. The fuel cell is in particular preferably used in a DMFC wherein an aqueous solution of methanol is used as a fuel.

Furthermore, the polymer electrolyte membrane fuel cell of the invention is preferably used as a power source for any mobile device. The fuel cell is in particular preferably used as a power source for portable instruments such as a cellular phone, a personal computer and a PDA, home electric appliances such as a vacuum cleaner, automobiles such as a passenger car, a bus and a truck, ships, and trains.

EXAMPLES

The present invention will be described by way of the following examples.

Example 1

(1) Production of an Anode and a Cathode

A carbon cloth made of carbon fiber woven cloth and manufactured by E-TEK in USA was treated with 20% PTFE. Specifically, the carbon cloth was immersed into a 20% by weight dispersion of polytetrafluoroethylene, which will be abbreviated to PTFE hereinafter, in water, pulled up therefrom, dried and fired. A carbon black dispersion containing 20% by weight of PTFE was applied onto one surface of the carbon cloth, and the resultant was fired to produce an electrode substrate. Onto this electrode substrate was applied an anode catalyst coating solution composed of Pt—Ru carried carbon catalysts "HiSPEC" (registered trademark) 7000 and "HiSPEC" (registered trademark), 6000 manufactured by Johnson & Matthey Co., a 20% solution of "Nafion" (registered trademark) manufactured by Du Pont Co, and n-propanol. The coating solution was then dried to produce an anode catalyst layer. The application of the anode catalyst coating solution was carried out onto the surface onto which the carbon black dispersion was applied. Similarly, onto the above-mentioned electrode substrate was applied a cathode catalyst coating solution composed of a Pt carried carbon catalyst TEC10V50E manufactured by Tanaka Kikinzoku Kogyo K.K. and a solution of "Nafion" (registered trademark). The coating solution was then dried to produce a cathode catalyst layer.

(2) Production and Evaluation of a Membrane Electrode Assembly (MEA)

"Nafion" (registered trademark) 117 manufactured by Du Pont Co. as a polymer electrolyte membrane was sandwiched between the anode and cathode produced in the step (1). The resultant was hot-pressed at a temperature of 100° C. for 30 minutes to produce a membrane electrode assembly (MEA) having an electrode area of 5 cm$^2$. This MEA was sandwiched between separators (see FIG. 2, channel: 1 mm square, current collector width: 1 mm). A 3% solution of methanol (MeOH) in water was supplied to the anode at 0.2 mL/min., and air was caused to flow to the cathode at 50 mL/min. The MEA was then evaluated. Temperature-conditioning water was caused to flow to the rear face of the separators so as to set the temperature to 20° C. In the evaluation, a constant electric current was caused to flow into the MEA. The voltage at this time was measured. While the electric current was successively increased, the voltage was measured until the voltage became 10 mV or less. The product of the electric current and the voltage at each measured point was equal to the power. The reaction Rr (O·cm$^2$) was measured by the impedance method after the evaluation was finished. About conditions the measurement, the electric current value of the highest power was applied thereto, and the amplitude was set to 1/10 of this electric current value. Specifically, a constant electric current of 40 mA/cm$^2$ was applied, and the amplitude was set to 4 mA/cm$^2$.

The thicknesses of the anode catalyst layer and the cathode catalyst layer in the produced MEA were measured by observing cross sections thereof with a scanning electron microscope and an electron probe microanalyzer. In the measurement, 5 or more cross sections per cm were observed at magnifications of about 100 to 1000 times. At each of the observed sections, thicknesses at 5 or more points were measured. The average thereof was used as the film thickness. In order to measure the platinum amount, the carbon amount and the ion conductor amount in each of the anode catalyst layer and the cathode catalyst layer, the area of the catalyst layer was first measured. Next, the electrode substrate was striped from the MEA, and the catalyst layer was scratched to measure the amount of the catalyst layer. Fluorescent X-rays were used to measure the total amount of platinum in this catalyst layer. The catalyst layer was dissolved in DMAc. The resultant was separated into a solution portion and an insoluble portion by centrifugation. The solvent in the solution portion was removed to measure the weight. This was used as the ion conductor amount. The ion conductor amount was divided by the area of the catalyst layer, so as to obtain the ion conductor amount per unit area. On the other hand, the insoluble portion was subjected to solvent-substitution with acetone, dried and then weighed. Thereafter, analysis was made by ICP emission spectroscopy, so as to obtain the total platinum amount in the catalyst layer. This total platinum amount was divided by the area of the catalyst layer, so as to obtain the platinum amount per unit area. It was proved that the platinum amount measured by the fluorescent X-rays was sufficiently consistent with that obtained by the ICP emission spectroscopy. The carbon amount was calculated by subtracting the metal amount obtained by the ICP emission spectroscopy from the weight of the insoluble portion. This carbon amount was divided by the area of the catalyst layer, so as to obtain the carbon amount per unit area. The reaction resistance Rr and the highest power of the resultant MEA, the thickness of each of the anode catalyst layer and the cathode catalyst layer, the platinum amount therein, the carbon amount therein, the ion conductor amount therein, and others are together shown in Tables 1-1 and 2-1.

Comparative Example 1

In Example 1, the anode "HiSPEC" (registered trademark) 7000 was not used, the PTFE solution was added to the anode catalyst coating solution, and the platinum amount in the anode catalyst layer was set to 7.6 mg/cm$^2$. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce a membrane electrode assembly and evaluate it. The resultant evaluation results of the membrane electrode assembly are shown in Tables 1-1 and 2-1.

Comparative Example 2

In Example 1; the anode "HiSPEC" (registered trademark) 6000 was not used, and the platinum amount in the anode catalyst layer was set to 0.4 mg/cm$^2$. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce a membrane electrode assembly and evaluate it. The resultant evaluation results of the membrane electrode assembly are shown in Tables 1-1 and 2-1.

Comparative Example 3

In Example 1, the anode "HiSPEC" (registered trademark) 6000 was not used, and the platinum amount in the anode catalyst layer was set to 4.4 mg/cm$^2$. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce a membrane electrode assembly and evaluate it. The resultant evaluation results of the membrane electrode assembly are shown in Tables 1-1 and 2-1.

Example 2

In Example 1, the platinum amount in the anode catalyst layer was set to 1.0 mg/cm$^2$. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce a membrane electrode assembly and evaluate it. The resultant evaluation results of the membrane electrode assembly are shown in Tables 1-1 and 2-1.

Example 3

In Example 1, the platinum amount in the anode catalyst layer was set to 5.0 mg/cm$^2$. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce a membrane electrode assembly and evaluate it. The resultant evaluation results of the membrane electrode assembly are shown in Tables 1-1 and 2-1.

Example 4

In Example 1, a catalyst made of platinum-ruthenium-iridium and carried on carbon was used instead of the "HiSPEC" (registered trademark) 7000, and the platinum amount in the anode catalyst layer was set to 0.5 mg/cm$^2$. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce a membrane electrode assembly and evaluate it. The resultant evaluation results of the membrane electrode assembly are shown in Tables 1-1 and 2-1.

Example 5

In Example 1, a catalyst made of platinum-iron-palladium-gold and carried on carbon was used instead of the "HiSPEC" (registered trademark) 7000, and the platinum amount in the anode catalyst layer was set to 7 mg/cm$^2$. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce a membrane electrode assembly and evaluate it. The resultant evaluation results of the membrane electrode assembly are shown in Tables 1-1 and 2-1.

Comparative Example 4

In Example 1, the "HiSPEC" (registered trademark) 7000 was not used in the anode coating solution, "Valcan (transliteration) XC" (registered trademark)-72R manufactured by Cabbot Co. was added thereto, and the platinum amount therein was set to 2.5 mg/cm$^2$. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce a membrane electrode assembly and evaluate it. The resultant evaluation results of the membrane electrode assembly are shown in Tables 1-1 and 2-1.

Example 6

In Example 1, the platinum amount in the anode catalyst layer was set to 22 mg/cm$^2$. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce a membrane electrode assembly and evaluate it. The resultant evaluation results of the membrane electrode assembly are shown in Tables 1-1 and 2-1.

Example 7

In Example 1, carbon paper TGPH-030 manufactured by Toray Industries, Inc. and treated with a 20% solution of PTFE in water was used instead of the carbon cloth in the anode and cathode. A Pt—Ru carried carbon catalyst "HiSPEC" (registered trademark) 10000 manufactured by Johnson Matthey Co. was used instead of the Pt—Ru carried carbon catalyst "HiSPEC" (registered trademark) 7000 manufactured by Johnson Matthey Co. The carbon amount, the platinum amount and the ion conductor amount in the anode catalyst layer, the thickness thereof, and the ratio of the platinum amount to the ionic group amount were changed to conditions shown in Table 1. In the cathode, a Pt carried carbon catalyst "HiSPEC" (registered trademark) 8000 manufactured by Johnson Matthey Co. was used instead of the TEC10V50E. The carbon amount, the platinum amount and the ion conductor amount therein, the thickness thereof, and the ratio of the platinum amount to the ionic group amount were changed to conditions shown in Table 2-1. The same method as in Example 1 except these was performed to produce an MEA and evaluate it. The resultant evaluation results of the membrane electrode assembly are shown together other data in Tables 1-1 and 2-1.

Example 8

In Example 7, the carbon amount, the platinum amount and the ion conductor amount in the anode catalyst layer, the thickness thereof, and the ratio of the platinum amount to the ionic group amount were changed to conditions shown in Table 1-1. Moreover, "HiSPEC" (registered trademark) 1000 was used besides the TEC10V50E. Additionally, the carbon amount, the platinum amount and the ion conductor amount in the cathode catalyst layer, the thickness thereof, and the ratio of the platinum amount to the ionic group amount were changed to conditions shown in Table 2-1. The same method as in Example 1 except these was performed to produce an MEA and evaluate it. The resultant evaluation results of the membrane electrode assembly are shown together other data in Tables 1-1 and 2-1.

Example 9

In Example 8, the carbon amount, the platinum amount and the ion conductor amount in the anode catalyst layer, the thickness thereof, and the ratio of the platinum amount to the ionic group amount were changed to conditions shown in Table 1-1. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 8 except these was performed to produce an MEA and evaluate it. The resultant evaluation results of the membrane electrode assembly are shown together other data in Tables 1-1 and 2-1.

Example 10

In Example 8, the carbon amount, the platinum amount and the ion conductor amount in the anode catalyst layer, the thickness thereof, and the ratio of the platinum amount to the ionic group amount were changed to conditions shown in Table 1-1. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 8 except these was performed to produce an MEA and evaluate it. The resultant evaluation results of the membrane electrode assembly are shown together other data in Tables 1-1 and 2-1.

Example 11

In Example 8, the carbon amount, the platinum amount and the ion conductor amount in the anode catalyst layer, the thickness thereof, and the ratio of the platinum amount to the ionic group amount were changed to conditions shown in Table 1-1. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 8 except these was performed to produce an MEA and evaluate it. The resultant evaluation results of the membrane electrode assembly are shown together other data in Tables 1-1 and 2-1.

Example 12

In Example 8, the carbon amount, the platinum amount and the ion conductor amount in the anode catalyst layer, the thickness thereof, and the ratio of the platinum amount to the ionic group amount were changed to conditions shown in Table 1-1. Moreover, the carbon amount, the platinum amount and the ion conductor amount in the cathode catalyst layer, the thickness thereof, and the ratio of the platinum amount to the ionic group amount were changed to conditions shown in Table 2-1. The same method as in Example 8 except these was performed to produce an MEA and evaluate it. The resultant evaluation results of the membrane electrode assembly are shown together other data in Tables 1-1 and 2-1.

TABLE 1-1

| | MEA Performances | | Anode Catalyst Layer | | | | | | | | |
|---|---|---|---|---|---|---|---|---|---|---|---|
| | | | Platinum | | Carbon | Ion Conductor | Platinum Amount /Ionic | | | | Electrode |
| | Log Rr | Power | Amount | Thickness | Amount | Amount | Group Amount | HiSPEC | | | Substrate |
| Nos. | ($\Omega \cdot cm^2$) | (mW/$cm^2$) | (mg/$cm^2$) | (μm) | (mg/$cm^2$) | (mg/$cm^2$) | (mg/mmol) | 7000 | 10000 | 6000 | Note) |
| Example 1 | 0.60 | 15 | 2.5 | 30 | 0.7 | 0.4 | 6900 | ○ | — | ○ | C |
| Comparative Example 1 | 1.00 | 7 | 7.6 | 75 | 0 | 7.6 | 1100 | — | — | ○ | C |
| Comparative example 2 | 1.00 | 7 | 0.4 | 25 | 0.7 | 0.4 | 1100 | ○ | — | | C |
| Comparative example 3 | 1.04 | 7 | 4.4 | 200 | 8 | 4.0 | 1200 | ○ | — | | C |
| Example 2 | 0.85 | 9 | 1.0 | 20 | 1.8 | 0.2 | 5500 | ○ | — | ○ | C |
| Example 3 | 0.48 | 20 | 5.0 | 30 | 0.7 | 0.9 | 6100 | ○ | — | ○ | C |
| Example 4 | 0.85 | 8 | 0.5 | 5 | 0.1 | 0.1 | 5500 | ○ | — | ○ | C |
| Example 5 | 0.70 | 14 | 7.0 | 70 | 1 | 1.0 | 7700 | ○ | — | ○ | C |
| Comparative example 4 | 1.04 | 5 | 2.5 | 30 | 0.7 | 0.4 | 6900 | — | — | ○ | C |
| Example 6 | 0.38 | 25 | 22 | 30 | 0.8 | 0.4 | 6900 | — | ○ | ○ | C |
| Example 7 | 0.30 | 30 | 2.5 | 20 | 0.4 | 1.4 | 2000 | — | ○ | ○ | P |
| Example 8 | 0.23 | 36 | 2.5 | 20 | 0.4 | 1.4 | 2000 | — | ○ | ○ | P |
| Example 9 | 0.18 | 40 | 20.0 | 25 | 0.4 | 1.4 | 16000 | — | ○ | ○ | P |
| Example 10 | 0.26 | 34 | 2.5 | 20 | 0.4 | 1.4 | 2000 | — | ○ | ○ | P |
| Example 11 | 0.23 | 36 | 2.5 | 20 | 0.4 | 1.4 | 2000 | — | ○ | ○ | P |
| Example 12 | 0.23 | 35 | 2.5 | 20 | 0.4 | 1.4 | 2000 | — | ○ | ○ | P |

Note)
C: Carbon Cloth,
P: Carbon Paper

TABLE 2-1

| | Cathode Catalyst Layer | | | | | | | | |
|---|---|---|---|---|---|---|---|---|---|
| | Platinum Amount | Thickness | Carbon Amount | Ion Conductor Amount | Platinum Amount/ Ionic Group Amount | TEC10 | HiSPEC | | Electrode Substrate |
| Nos. | (mg/$cm^2$) | (μm) | (mg/$cm^2$) | (mg/$cm^2$) | (mg/mmol) | V50E | 1000 | 8000 | Note) |
| Example 1 | 2.5 | 40 | 2.5 | 2 | 2800 | ○ | — | — | C |
| Comparative example 1 | 2.7 | 50 | 2.7 | 1.9 | 3100 | ○ | — | — | C |
| Comparative example 2 | 0.1 | 2 | 0.1 | 0.1 | 2200 | ○ | — | — | C |
| Comparative example 3 | 23 | 550 | 23 | 16 | 3200 | ○ | — | — | C |
| Example 2 | 2.6 | 45 | 2.6 | 1.8 | 3200 | ○ | — | — | C |
| Example 3 | 1.2 | 20 | 1.2 | 0.8 | 3300 | ○ | — | — | C |
| Example 4 | 20 | 450 | 20 | 14 | 3100 | ○ | — | — | C |
| Example 5 | 0.6 | 10 | 0.6 | 0.4 | 3300 | ○ | — | — | C |
| Comparative example 4 | 2.5 | 40 | 2.5 | 2 | 2800 | ○ | — | — | C |
| Example 6 | 4 | 70 | 4 | 2.8 | 3100 | ○ | — | — | C |
| Example 7 | 2.5 | 40 | 2.5 | 2 | 2800 | — | — | ○ | P |
| Example 8 | 6.5 | 35 | 1.3 | 1.0 | 14560 | ○ | ○ | — | P |
| Example 9 | 3 | 16 | 0.6 | 0.5 | 14560 | ○ | ○ | — | P |
| Example 10 | 5 | 28 | 1.0 | 1.6 | 7280 | ○ | ○ | — | P |
| Example 11 | 25 | 70 | 2 | 7 | 7900 | ○ | ○ | — | P |
| Example 12 | 5 | 30 | 0.5 | 2.5 | 4400 | ○ | ○ | — | P |

Note)
C: Carbon Cloth,
P: Carbon Paper

Example 13

In Example 8, the width of the channel in the separator was changed to 2 mm, and the flow rate of air in the cathode was changed to 150 mL/min. The same evaluation as in Example 8 except these was made. The results are shown in Tables 1-2 and 2-2.

Example 14

In the Example 8, the concentration of methanol was changed to 10% by weight. The same evaluation as in Example 8 except this was made. The results are shown in Tables 1-2 and 2-2.

Example 15

In the Example 8, the concentration of methanol was changed to 30% by weight. The same evaluation as in Example 11 except this was made. The results are shown in Tables 1-2 and 2-2.

Example 16

In the Example 8, conditions for producing the anode, the electrolyte membrane, and the MEA were changed as described below. The same evaluation as in Example 8 except these was made. The results are shown in Tables 1-2 and 2-2.

(1) Production of an Anode (Synthesis of Fluorenyl Poly(Ether Ether Ketone))

35 g of potassium carbonate, 14 g of hydroquinone, 38 g of 4,4'-(9H-fluorene-9-ylidene)bisphenol, and 55 g of 4,4'-difluorobenzophenone were used to conduct polymerization at a temperature of 175° C. in N-methylpyrrolidone (NMP). After the polymerization, the resultant was washed with water, and again precipitated with a large amount of methanol so as to be purified. In this way, fluorenyl poly(ether ether ketone), which will be abbreviated to FK hereinafter, was quantitatively yielded. The weight-average molecular weight of the FK was 100000.

(Sulfonation of the FK)

At room temperature, 12 g of the polymer (FK) yielded as described above was dissolved into chloroform under the atmosphere of $N_2$. Thereafter, 17 mL of chlorosulfonic acid was dropwise added slowly to the solution while the solution was vigorously stirred. In this way, they were caused to react for 15 minutes. The resultant white precipitation was separated by filtration, and pulverized, washed sufficiently with water, and then dried to yield target sulfonated FK, which will be abbreviated to SFK hereinafter. The resultant SFK had a sulfonic acid group density of 2.5 mmol/g.

(Production of an Anode)

An anode was produced in the same way as in Example 11 except that a solution of the SFK prepared as described above in N,N-dimethylacetoamide was used instead of the "Nafion" (registered trademark) in Example 11.

(2) Production of a Polymer Electrolyte Membrane

The SFK yielded in the item (1) was cast and applied, in the form of the solution thereof in N,N-dimethylacetoamide, onto a glass substrate, and then the resultant was dried at a temperature of 100° C. for 3 hours, whereby the solvent was removed to form a film. The resultant film had a film thickness of 220 μm and was a flexible, transparent and colorless film.

(3) Production and Evaluation of an MEA

The polymer electrolyte membrane yielded in the item (2) and the anode produced in the item (1) were used to produce an MEA in the same way as in Example 11 except that the hot pressing time was changed to 10 minutes.

Example 17

An MEA was produced and evaluated in the same way as in Example 16 except that poly(vinylidene fluoride) was used instead of the SFK when the anode was produced in Example 16. The results are shown in Tables 1-2 and 2-2.

TABLE 1-2

| | MEA Performances | | Anode Catalyst Layer | | | | | | | | |
|---|---|---|---|---|---|---|---|---|---|---|---|
| | | | Platinum | | Carbon | Ion Conductor | Platinum Amount/Ionic | | | | Electrode |
| | Log Rr | Power | Amount | Thickness | Amount | Amount | Group Amount | | HiSPEC | | Substrate |
| Nos. | ($\Omega \cdot cm^2$) | (mW/cm$^2$) | (mg/cm$^2$) | (μm) | (mg/cm$^2$) | (mg/cm$^2$) | (mg/mmol) | 7000 | 10000 | 6000 | Note) |
| Example 13 | 0.20 | 38 | 2.5 | 20 | 0.4 | 1.4 | 2000 | — | ○ | ○ | P |
| Example 14 | 0.18 | 40 | 2.5 | 20 | 0.4 | 1.4 | 2000 | — | ○ | ○ | P |
| Example 15 | 0.36 | 27 | 2.5 | 20 | 0.4 | 1.4 | 2000 | — | ○ | ○ | P |
| Example 16 | 0.26 | 34 | 2.5 | 15 | 0.4 | 0.7 | 1430 | — | ○ | ○ | P |
| Example 17 | 0.23 | 36 | 2.0 | 10 | 0.3 | 0 | — | — | ○ | ○ | P |

Note)

C: Carbon Cloth,

P: Carbon Paper

TABLE 2-2

| | | | | | Cathode Catalyst Layer | | | | |
|---|---|---|---|---|---|---|---|---|---|
| | Platinum Amount | Thickness | Carbon Amount | Ion Conductor Amount | Platinum Amount/Ionic Group Amount | TEC10 | HiSPEC | | Electrode Substrate |
| Nos. | (mg/cm$^2$) | (μm) | (mg/cm$^2$) | (mg/cm$^2$) | (mg/mmol) | V50E | 1000 | 8000 | Note) |
| Example 13 | 6.5 | 35 | 1.3 | 1.0 | 14560 | ○ | ○ | — | P |
| Example 14 | 6.5 | 35 | 1.3 | 1.0 | 14560 | ○ | ○ | — | P |
| Example 15 | 6.5 | 35 | 1.3 | 1.0 | 14560 | ○ | ○ | — | P |
| Example 16 | 6.5 | 35 | 1.3 | 1.0 | 14560 | ○ | ○ | — | P |
| Example 17 | 6.5 | 35 | 1.3 | 1.0 | 14560 | ○ | ○ | — | P |

Note)
C: Carbon Cloth,
P: Carbon Paper

Example 18

An MEA was produced and evaluated in the same way as in each of Examples 1-15 except that the polymer electrolyte membrane produced in Example 16(2) was used instead of the "Nafion" (registered trademark) 117 manufactured by Du Pont Co. in the Examples. Each of the resultant MEA's had the same MEA performance as each of the Examples.

Example 19

Figure 4:
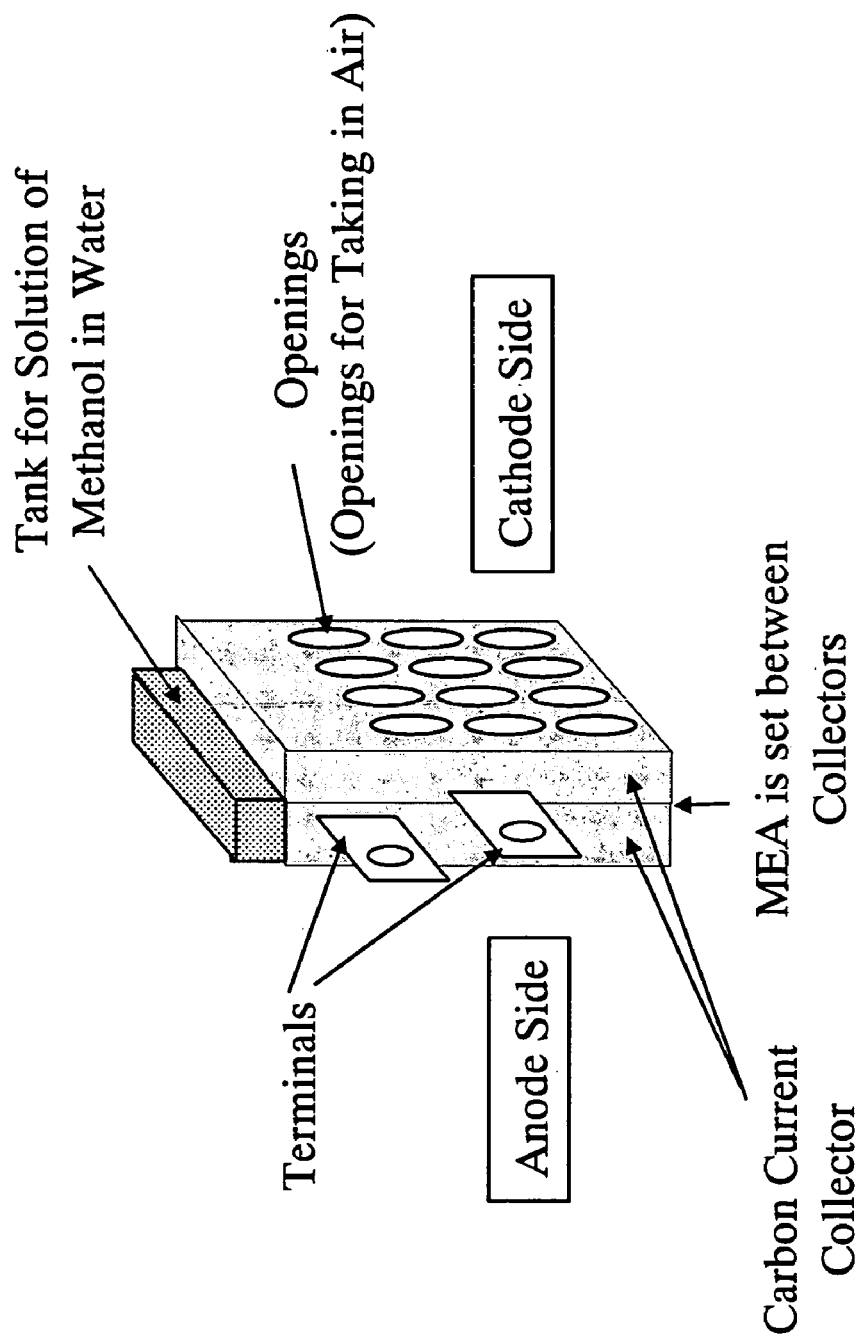
FIG. 4 is a perspective view illustrating an example of the outline of the cell of the present invention.

The MEA produced in Example 17 was used to produce a polymer electrolyte membrane fuel cell illustrated in FIG. 4. The ratio of openings in its cathode current collector was set to 50%. In its anode current collector, the width of channels therein, the depth thereof and the interval between the channels were set to 1 mm, 2 mm, and 2 mm, respectively. A tank for a solution of methanol in water was arranged above the cell. The supply of air into the cathode and that of the solution of methanol in water into the anode were in accordance with a natural supply manner. The solution of methanol in water was supplied from the tank to the lower portion of the MEA. The solution was caused to pass through the channels contacting the MEA, and caused to flow so as to be returned into the tank. Characteristics of this polymer electrolyte membrane fuel cell are shown in Table 3. The temperature of the measuring atmosphere was adjusted to set the temperature of the cell portion, which was measured with a thermocouple connected to the current collectors, to 20° C.

Example 20

Figure 5:
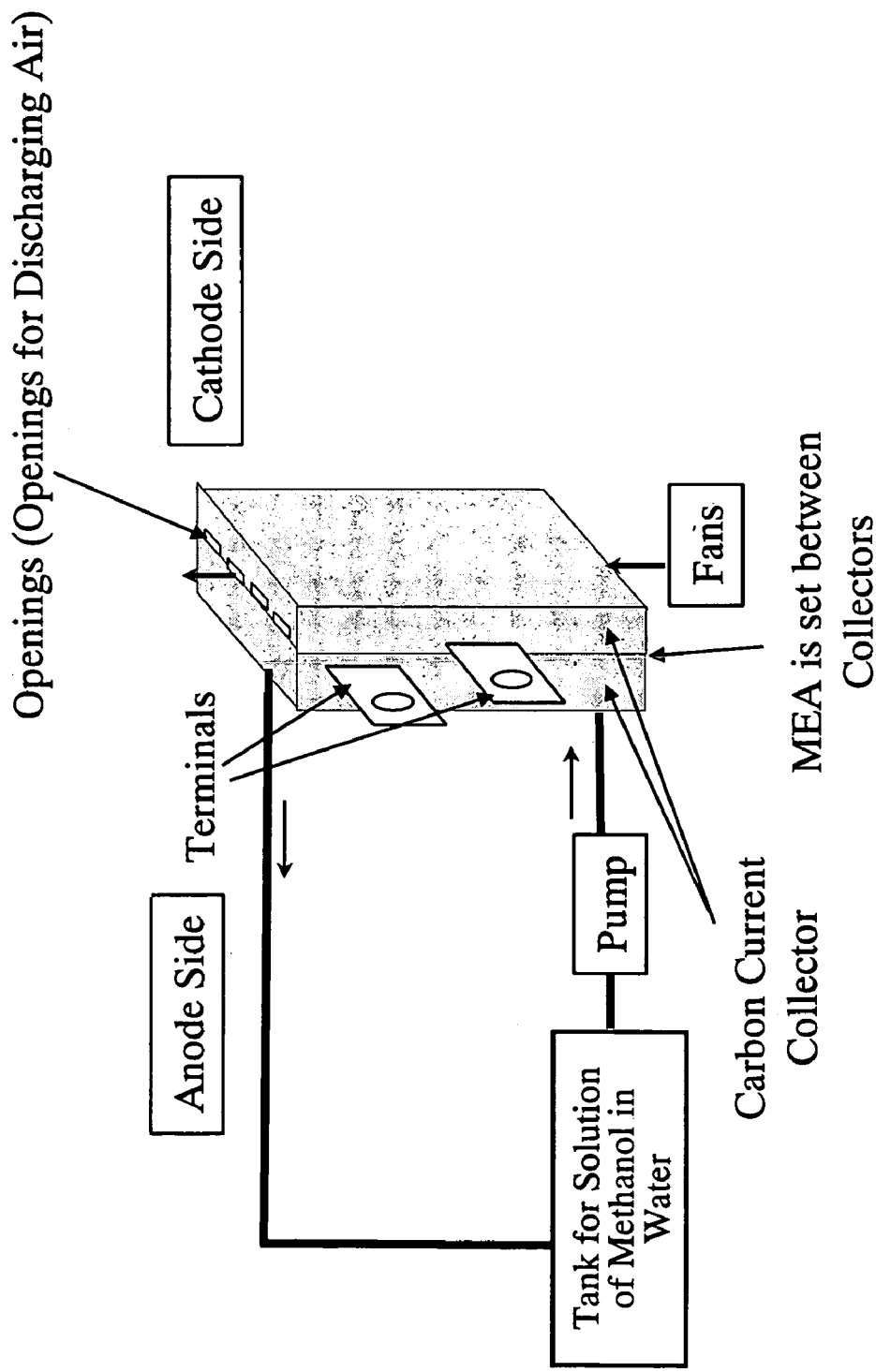
FIG. 5 is a perspective view illustrating another example of the outline of the cell of the present invention.
Figure 6:
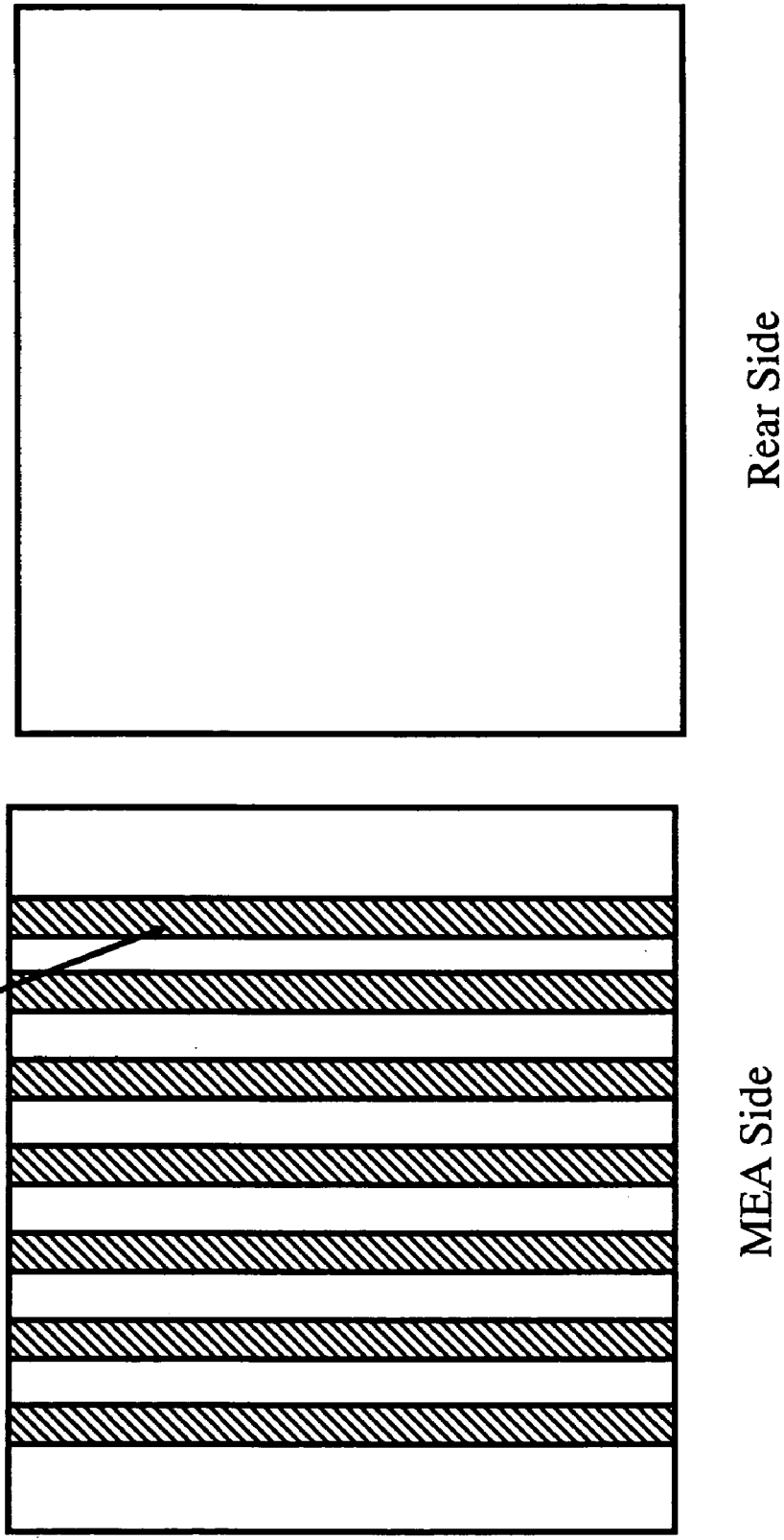
FIG. 6 are schematic views illustrating an example of the shape of channels in the cathode collector of the present invention.

The MEA produced in Example 17 was used to produce a polymer electrolyte membrane fuel cell illustrated in FIG. 5. In its anode current collector, the width of channels therein, the depth thereof, and the interval between the channels were set to 1 mm, 1 mm, and 1 mm, respectively. Channels in its cathode current collector are illustrated in FIG. 6. Small-sized fans (flow rate: 100 mL/min.) were used to supply air into the cathode. A small-sized pump (flow rate: 0.5 mL/min.) was used to supply the solution of methanol in water into the anode. Characteristics of this polymer electrolyte membrane fuel cell are shown in Table 3. The temperature of the measuring atmosphere was adjusted to set the temperature of the cell portion, which was measured with a thermocouple connected to the current collectors, to 20° C.

TABLE 3

| | Polymer Electrolyte Membrane Fuel Cell Performances | | Total Area of MEA (cm$^2$) |
|---|---|---|---|
| Nos. | Resistance (Ω·cm$^2$) | Power (mW/cm$^2$) | |
| Example 19 | 0.48 | 20 | 5 |
| Example 20 | 0.37 | 27 | 5 |

INDUSTRIAL APPLICABILITY

A novel membrane electrode assembly of the present invention which can attain a high power is applied to a polymer electrolyte membrane fuel cell. This makes it possible to make the polymer electrolyte membrane fuel cell small-sized. The fuel cell can be used as a power source for various electric appliances, typical examples of which include mobile electric appliances such as a cellular phone and a notebook-sized personal computer. Thus, the practicability thereof is high.

Furthermore, the polymer electrolyte membrane fuel cell of the invention can be applied to any fuel cell wherein hydrogen is used as fuel or an organic solvent such as methanol or dimethyl ether is used as fuel. The fuel cell is suitable as an electric power source for various mobile devices. Thus, the fuel cell is industrially useful.

The invention claimed is:

1. A membrane electrode assembly comprising an anode catalyst layer, a cathode catalyst layer, an anode and a cathode each made of an electrode substrate, and a polymer electrolyte membrane sandwiched between the anode and the cathode, the membrane electrode assembly satisfying the following expression:

$$-2 \leq \log Rr < 1$$

wherein the reaction resistance at 20° C. is represented by Rr (Ω·cm$^2$);

the polymer electrolyte membrane is a hydrocarbon-based polymer electrolyte membrane;

the anode catalyst layer has a thickness of 1 μm or more and 150 μm or less and a platinum content of 0.1 mg/cm$^2$ or more and 25 mg/cm$^2$ or less;

the cathode catalyst layer has a thickness of 1 μm or more and 500 μm or less and a platinum content of 0.1 mg/cm$^2$ or more and 25 mg/cm$^2$ or less;

the anode catalyst layer has an amount of platinum per micrometer of thickness of 0.07 mg/cm$^2$ or more;

the platinum in the anode catalyst layer exists in a first state and a second state, platinum being carried on a surface of a carbonaceous material in the first state and platinum being mixed into the anode catalyst layer without being carried on the carbonaceous material in the second state; and the cathode catalyst layer has an amount of platinum per micrometer of thickness of 0.15 mg/cm$^2$ or more.

2. The membrane electrode assembly according to claim 1, wherein the reaction resistance Rr at 20° C. satisfies the following expression:

$-1.5 \leq \log Rr \leq 0.5$.

3. The membrane electrode assembly according to claim 1, wherein the reaction resistance Rr at 20° C. satisfies the following expression:

$-1 \leq \log Rr \leq 0.3$.

4. The membrane electrode assembly according to claim 1, wherein the anode catalyst layer has a carbonaceous material content of 0.1 mg/cm$^2$ or more and 5 mg/cm$^2$ or less.

5. The membrane electrode assembly according to claim 1, wherein the anode catalyst layer has a carbonaceous material content of 0.1 mg/cm$^2$ or more and 1 mg/cm$^2$ or less.

6. The membrane electrode assembly according to claim 1, wherein the anode catalyst layer has an ion conductor content of 0.1 mg/cm$^2$ or more and 15 mg/cm$^2$ or less.

7. The membrane electrode assembly according to claim 1, wherein the anode catalyst layer has a platinum content of 0.5 mg/cm$^2$ or more and 5 mg/cm$^2$ or less and a thickness of 1 μm or more and 30 μm or less.

8. The membrane electrode assembly according to claim 1, wherein the anode catalyst layer has a platinum content of 1.5 mg/cm$^2$ or more and 4 mg/cm$^2$ or less and a thickness of 5 μm or more and 30 μl or less.

9. The membrane electrode assembly according to claim 1, wherein the cathode catalyst layer has a carbonaceous material content of 0.1 mg/cm$^2$ or more and 5 mg/cm$^2$ or less.

10. The membrane electrode assembly according to claim 1, wherein the cathode catalyst layer has an ion conductor content of 0.1 mg/cm$^2$ or more and 15 m$^2$/cm$^2$ or less.

11. The membrane electrode assembly according to claim 1, wherein the cathode catalyst layer has a platinum content of 1 mg/cm$^2$ or more and 8 mg/cm$^2$ or less and a thickness of 1 μm or more and 40 μm or less.

12. The membrane electrode assembly according to claim 1, wherein the cathode catalyst layer has a platinum content of 3 mg/cm$^2$ or more and 8 mg/cm$^2$ or less and a thickness of 5 μm or more and 30 μm or less.

13. The membrane electrode assembly according to claim 1, wherein the anode catalyst and cathode catalyst layers comprise a metal made of at least one element selected from the group consisting of Pt, Ru, Au, Pd, Ir and Fe.

14. A polymer electrolyte membrane fuel cell comprising the membrane electrode assembly according to any one of claims 1, 2, 3, 4-8 and 9-13.

15. A portable instrument or mobile device, wherein the polymer electrolyte membrane fuel cell according to claim 14 is mounted.

\* \* \* \* \*

UNITED STATES PATENT AND TRADEMARK OFFICE
CERTIFICATE OF CORRECTION

| | | |
|---|---|---|
| PATENT NO. | : 7,824,786 B2 | Page 1 of 1 |
| APPLICATION NO. | : 10/556593 | |
| DATED | : November 2, 2010 | |
| INVENTOR(S) | : Shunji Kono et al. | |

It is certified that error appears in the above-identified patent and that said Letters Patent is hereby corrected as shown below:

<u>Title page under (56) References Cited, under "U.S. PATENT DOCUMENTS"</u>:

Please replace "6,011,500 A  1/2000  Noda et al. 341/144" with

--6,001,500 12/1999 Bass et al.--

<u>In the Claims</u>:

At column 36, claim number 10, line number 10, please replace "$m^2/cm^2$" with

--$mg/cm^2$--

Signed and Sealed this
Twenty-first Day of February, 2012

David J. Kappos
*Director of the United States Patent and Trademark Office*